(12) United States Patent
Lainema et al.

(10) Patent No.: US 12,108,050 B2
(45) Date of Patent: Oct. 1, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Jani Lainema, Tampere (FI); Francesco Cricri, Tampere (FI); Emre Baris Aksu, Tampere (FI); Alireza Zare, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 121 days.

(21) Appl. No.: 17/760,017
(22) PCT Filed: Feb. 12, 2021
(86) PCT No.: PCT/FI2021/050095
§ 371 (c)(1),
(2) Date: Aug. 3, 2022
(87) PCT Pub. No.: WO2021/165569
PCT Pub. Date: Aug. 26, 2021

(65) Prior Publication Data
US 2023/0062752 A1    Mar. 2, 2023

(30) Foreign Application Priority Data
Feb. 21, 2020 (FI) .................................... 20205184

(51) Int. Cl.
*H04N 19/149*     (2014.01)
*G06N 3/045*      (2023.01)
(Continued)

(52) U.S. Cl.
CPC ........... *H04N 19/149* (2014.11); *G06N 3/045* (2023.01); *H04N 19/159* (2014.11); *H04N 19/176* (2014.11)

(58) Field of Classification Search
CPC .. H04N 19/149; H04N 19/159; H04N 19/176; H04N 19/147; H04N 19/117;
(Continued)

(56) References Cited

U.S. PATENT DOCUMENTS 8,204,128 B2     6/2012   Huchet et al.
2019/0124348 A1  4/2019   Yang

FOREIGN PATENT DOCUMENTS

CN     108520505 A     9/2018
EP     3310058 A1      4/2018
(Continued)

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Joseph W Becker
(74) *Attorney, Agent, or Firm* — Joseph C. Drish; Harrington & Smith

(57) ABSTRACT

The embodiments relate to a method for encoding and a decoding, and apparatuses for the same. The method for encoding comprises receiving a block of a video frame for encoding (1510); making a decision on whether or not a learning-based model is to be applied as a processing step for encoding the block (1520); applying the learning-based model for said input block according to the decision, where the learning-based model has been selectively fine-tuned according to information relating to activation of the learning-based model of previously-decoded blocks (1530); encoding a signal corresponding to the decision on usage of the learning-based model into a bitstream (1540); and encoding the block into a bitstream with an information whether the block is to be used for finetuning (1550).

20 Claims, 16 Drawing Sheets

(51) Int. Cl.
*H04N 19/159* (2014.01)
*H04N 19/176* (2014.01)

(58) Field of Classification Search
CPC ........ H04N 19/82; G06N 3/045; G06N 3/048; G06N 3/084; G06T 9/002
See application file for complete search history.

(56) References Cited

FOREIGN PATENT DOCUMENTS

| | | |
|---|---|---|
| WO | 2017/036370 A1 | 3/2017 |
| WO | 2019/072921 A1 | 4/2019 |
| WO | 2019/197712 A1 | 10/2019 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

Office action received for corresponding Finnish Patent Application No. 20205184, dated Sep. 22, 2020, 11 pages.

International Search Report and Written Opinion received for corresponding Patent Cooperation Treaty Application No. PCT/FI2021/050095, dated May 26, 2021, 17 pages.

Wu, Feng, et al., "Description of SDR video coding technology proposal by University of Science and Technology of China, Peking University, Harbin Institute of Technology, and Wuhan University (IEEE 1857.10 Study Group)", Joint Video Experts Team (JVET) of ITU-TSG 16 WP3 and ISO/IEC JTC 1/SC29/WG11, Document JVET-J0032-v2, Apr. 2018, 48 pages.

Zhang, Shufang, et al., "Recursive Residual Convolutional Neural Network-Based In-Loop Filtering for Intra Frames", IEEE Transactions On Circuits And Systems For Video Technology, vol. 30, No. 7, July 22020, 13 pages.

Li, Yiming, et al., "CE13 : Summary Report on Neural Network based Filter for Video Coding", 11Joint Video Experts Team (JVET) of ITU-TSG 16 WP 3 and ISO/IEC JTC1/SC 29/WG11, Document: JVET-N0033-v2, Mar. 2019, 9 pages.

Ma, Siwei, et al., "Image and Video Compression with Neural Networks: A Review", IEEE Transactions On Circuits And Systems For Video Technology, Apr. 2019, 16 pages.

Liu, Dong, et al., "Deep Learning-Based Technology in Responses to the Joint Call for Proposals on Video Compression With Capability Beyond HEVC", IEEE Transactions On Circuits And Systems For Video Technology, vol. 30, No. 5, May 2020, 14 pages.

METHOD, AN APPARATUS AND A COMPUTER PROGRAM PRODUCT FOR VIDEO ENCODING AND VIDEO DECODING

RELATED APPLICATION

This application claims priority to PCT Application No. PCT/FI2021/050095, filed on Feb. 12, 2021, which claims priority to Finnish Application No. 20205184, filed on Feb. 21, 2020, each of which is incorporated herein by reference in its entirety.

TECHNICAL FIELD

The present solution generally relates to video encoding and decoding. In particular, the solution relates to learning-based algorithm being used in encoding and decoding.

BACKGROUND

Recently, the development of various neural network techniques and other learning-based algorithms has enabled their extensive utilization in various applications.

Lately, neural networks have been used for compressing and de-compressing data such as images. One of the used architectures for such task is the auto-encoder, which is a neural network consisting of two parts: a neural encoder and a neural decoder. The neural encoder takes as input an image and produces a code which requires less bits than the input image. This code may have obtained by a binarization or quantization process after the neural encoder. The neural decoder takes in this code and reconstructs the image which was input to the neural encoder.

SUMMARY

The present embodiments are targeted to improve the operation of the neural network filter used in decoding.

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising
  receiving a block of a video frame for encoding;
  making a decision on whether or not a learning-based model is to be applied as a processing step for encoding the block;
  applying the learning-based model for said input block according to the decision, where the learning-based model has been selectively fine-tuned according to information relating to activation of the learning-based model of previously-decoded blocks;
  encoding a signal corresponding to the decision on usage of the learning-based model into a bitstream; and
  encoding the block into a bitstream with an information whether the block is to be used for finetuning.

According to a second aspect, there is provided a method for decoding, comprising:
  receiving a bitstream representing an encoded image;
  decoding from a bitstream a signal indicating a decision on usage of a learning-based model for a block;
  decoding from a bitstream a block by using an intra-prediction;
  decoding from a bitstream an information whether the block is to be used for finetuning;
  applying the learning-based model for said block according to the decision, where the learning-based model has been selectively fine-tuned according to information relating to activation of the learning-based model of previously-decoded blocks; and
  reconstructing an image according to decoded blocks.

According to a third aspect, there is provided an apparatus comprising
  means for receiving a block of a video frame for encoding;
  means for making a decision on whether or not a learning-based model is to be applied as a processing step for encoding the block;
  means for applying the learning-based model for said input block according to the decision, where the learning-based model has been selectively fine-tuned according to information relating to activation of the learning-based model of previously-decoded blocks;
  means for encoding a signal corresponding to the decision on usage of the learning-based model into a bitstream; and
  means for encoding the block into a bitstream with an information whether the block is to be used for finetuning.

According to a fourth aspect, there is provided an apparatus comprising
  means for receiving a bitstream representing an encoded image;
  means for decoding from a bitstream a signal indicating a decision on usage of a learning-based model for a block;
  means for decoding from a bitstream a block by using an intra-prediction;
  means for decoding from a bitstream an information whether the block is to be used for finetuning;
  means for applying the learning-based model for said block according to the decision, where the learning-based model has been selectively fine-tuned according to information relating to activation of the learning-based model of previously-decoded blocks; and
  means for reconstructing an image according to decoded blocks.

According to a fifth aspect, there is provided an apparatus comprising at least one processor, memory including computer program code, the memory and the computer program code configured to, with the at least one processor, cause the apparatus to perform at least the following:
  receive a block of a video frame for encoding;
  make a decision on whether or not a learning-based model is to be applied as a processing step for encoding the block;
  apply the learning-based model for said input block according to the decision, where the learning-based model has been selectively fine-tuned according to information relating to activation of the learning-based model of previously-decoded blocks;
  encode a signal corresponding to the decision on usage of the learning-based model into a bitstream; and encode the block into a bitstream with an information whether the block is to be used for finetuning.

According to a sixth aspect, there is provided an apparatus comprising at least one processor, memory including computer program code, the memory and the computer program code configured to, with the at least one processor, cause the apparatus to perform at least the following:
receive a bitstream representing an encoded image;
decode from a bitstream a signal indicating a decision on usage of a learning-based model for a block;
decode from a bitstream a block by using an intra-prediction;
decode from a bitstream an information whether the block is to be used for finetuning;
apply the learning-based model for said block according to the decision, where the learning-based model has been selectively fine-tuned according to information relating to activation of the learning-based model of previously-decoded blocks; and
reconstruct an image according to decoded blocks.

According to a seventh aspect, there is provided a computer program product comprising computer program code configured to, when executed on at least one processor, cause an apparatus or a system to:
receive a block of a video frame for encoding;
make a decision on whether or not a learning-based model is to be applied as a processing step for encoding the block;
apply the learning-based model for said input block according to the decision, where the learning-based model has been selectively fine-tuned according to information relating to activation of the learning-based model of previously-decoded blocks;
encode a signal corresponding to the decision on usage of the learning-based model into a bitstream; and
encode the block into a bitstream with an information whether the block is to be used for finetuning.

According to an eighth aspect, there is provided a computer program product comprising computer program code configured to, when executed on at least one processor, cause an apparatus or a system to:
receive a bitstream representing an encoded image;
decode from a bitstream a signal indicating a decision on usage of a learning-based model for a block;
decode from a bitstream a block by using an intra-prediction;
decode from a bitstream an information whether the block is to be used for finetuning;
apply the learning-based model for said block according to the decision, where the learning-based model has been selectively fine-tuned according to information relating to activation of the learning-based model of previously-decoded blocks; and
reconstruct an image according to decoded blocks.

According to an embodiment, the processing step comprises one or more of the following:
enhancing visual quality of the predicted or reconstructed content is to be applied for said block;
predicting the block based on previously encoded or reconstructed blocks;
processing a prediction error block between the block and a predicted block.

According to an embodiment, the learning-based model is fine-tuned by training the learning-based model by using nearby blocks to which learning-based model was not applied and by using ground-truth corresponding blocks being used instead of the output of the learning-based model with blocks to which the learning-model has been applied.

According to an embodiment, fine-tuning is also applied with blocks to which the learning-model has been applied.

According to an embodiment, it is selectively provided: output of a first copy of a learning model and the ground-truth as one of the possible inputs to a discriminator, and the output of a second copy of a learning model as the other possible input to a discriminator.

According to an embodiment, the first copy of a learning model is finetuned according to adversarial training, in order to maximize the discriminator's loss.

According to an embodiment, the discriminator is trained in order to minimize the discriminator's loss.

According to an embodiment, when the decision is not to use the learning-based model, the input for the learning-based model is used as output instead of the output of the learning-based model.

According to an embodiment, the decision of using the learning-base model is based on one of the following: rate-distortion optimization or output of another neural network.

According to an embodiment, an activation and a deactivation of the learning-based model is controlled by means of a switch.

According to an embodiment, the switch is a neural network switch, whereupon the apparatus further comprises means for determining a classification confidence of the switch, means for comparing the classification confidence to a predetermined threshold, and means for encoding the signal corresponding to the decision on usage of the learning-based model only when the classification confidence is below the predetermined threshold.

According to an embodiment, the switch is a neural network switch, wherein the switch is configured to generate a predicted signal corresponding to the decision on usage of the learning-based model.

According to an embodiment, the switch is a neural network switch, whereupon the apparatus further comprises means for using a classification confidence being output by the switch with the predicted signal in encoding the signal corresponding to the decision on usage of the learning-based model.

According to an embodiment, the learning-based model is used in addition to or instead of a set of a conventional processing step performing a similar task without a learning-based model.

According to an embodiment, when the learning-based model is used in addition to the conventional processing step, the output of the learning-based model and the conventional processing step is combined, and the combination is used as the output.

According to an embodiment, the signal corresponding to the decision is included into the bitstream for any of the following: each block, each coding unit, each coding tree unit.

According to an embodiment, an additional neural network is trained to make a decision on whether or not a learning-based model as a further filter to enhance visual quality of the reconstructed content is needed.

According to an embodiment, the training is performed based on information from one or more previously-decoded blocks.

According to an embodiment, the learning-based model is a neural network filter.

According to an embodiment, a computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

In the following, several embodiments will be described in the context of neural networks (NN). In particular, the several embodiments improve the operation of a neural network (NN) filter used in the decoding loop of a video codec, thus enabling sparse supervision for neural network filter in video coding. It is to be noted, however, that the invention is not limited to neural networks. In fact, the different embodiments have applications in any machine learning environment and with other learning-based algorithms, such as Support Vector Machines (SVMs), Decision Trees, Random Forest, etc. Nevertheless, in the following description, neural networks are used as an example, and in particular neural network filters. Furthermore, if multiple learning-based filters are used, the present embodiments may involve one or more of those filters (thus, a "NN filter" may refer to one or more NN filters). A neural network filter may input an image or a block of an image, apply a neural network for the input, and resulting from applying the neural network, produce a filtered image or a filtered block of an image as output.

Deep learning is a solution for analyzing data and is a sub-field of machine learning which has emerged in the recent years. Deep learning is a field, which studies artificial neural networks (ANN), also referred to as neural network (NN). A neural network is a computation graph representation, usually made of several layers of successive computation. Each layer is made of units or neurons computing an elemental/basic computation. A unit is connected to one or more other units, and the connection may have associated a weight. The weight may be used for scaling the signal passing through the associated connection. Weights may be learnable parameters, i.e., values which can be learned from training data. There may be other learnable parameters, such as those of batch-normalization layers.

Deep learning may involve learning of multiple layers of nonlinear processing units, either in supervised or in unsupervised manner, or in semi-supervised manner. Each learned layer extracts feature representations from the input data. Features from lower layers represent low-level semantics (i.e. less abstract concepts, such as edges and texture), whereas higher layers represent higher-level semantics (i.e., more abstract concepts, like scene class). Unsupervised learning applications typically include pattern analysis and representation (i.e., feature) learning, whereas supervised learning applications may include classification of image objects (in the case of visual data).

Deep learning techniques may be used e.g. for recognizing and detecting objects in images or videos with great accuracy, outperforming previous methods. In addition, deep learning techniques are utilized in an ever-creasing number of applications for any type of device.

Figure 1:
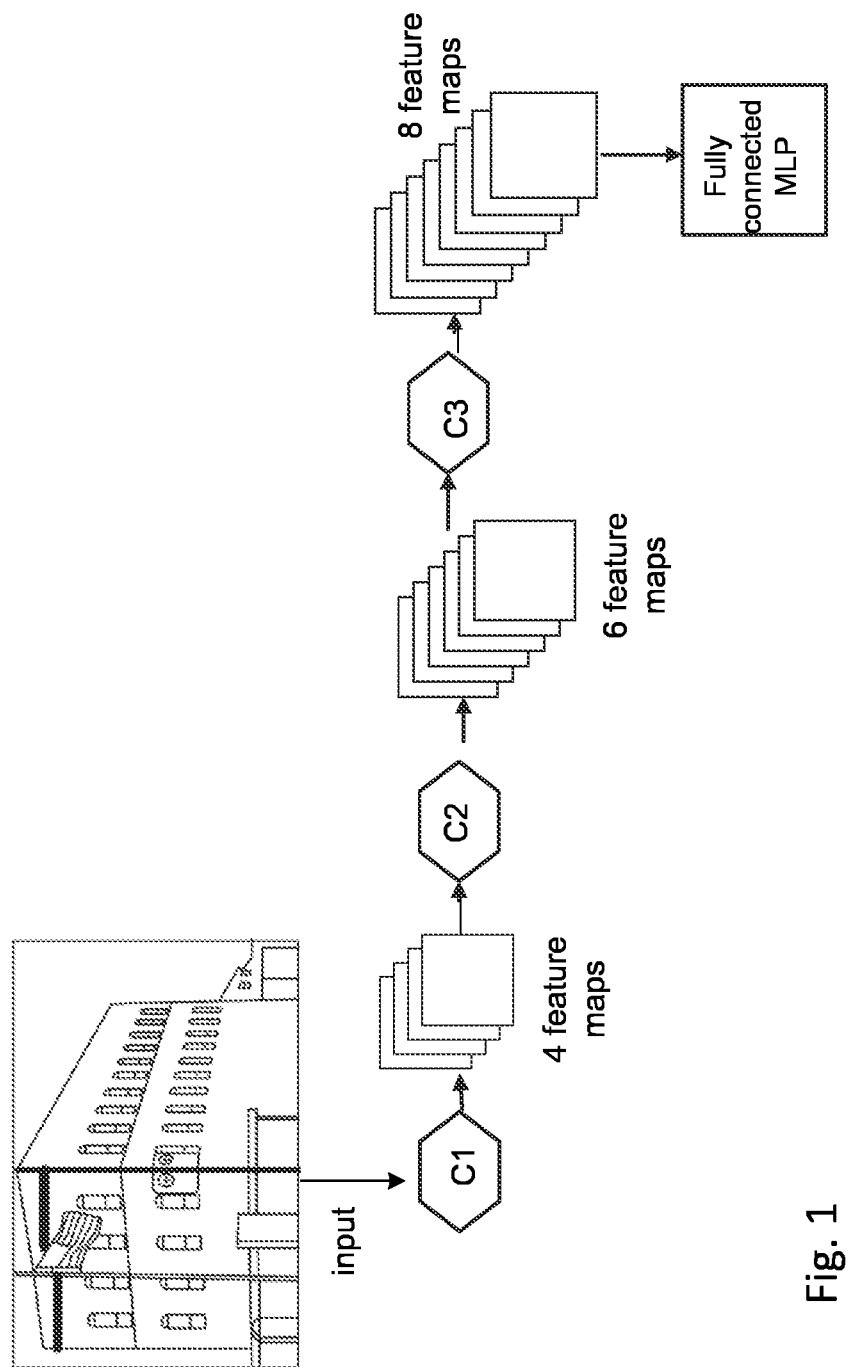
FIG. 1 shows an example of a convolutional neural network.

Deep learning expects training in order to be able to perform the expected analysis. During the training stage, deep learning techniques build computation layers which extract features of increasingly abstract level. Thus, at least the initial layers of an artificial neural network represent a feature extractor. The basic operation of a neural network is discussed with reference to FIG. 1 representing a Convolutional Neural Network including a feature extractor in deep learning techniques. This example of a CNN comprises one or more convolutional layers, fully connected layers, and a classification layer on top. CNNs are relatively easy to train compared to other deep neural networks and have fewer learnable parameters to be estimated. Therefore, CNNs are highly attractive architecture to use, especially in image and speech applications.

In the example of FIG. 1, the input to a CNN is an image, but any other data could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 1 has only three feature (or abstraction, or semantic) layers C1, C2, C3 for the sake of simplicity, but CNNs may have more than three convolution layers.

The first convolution layer C1 of the CNN may comprise extracting 4 feature-maps from the first layer (i.e. from the input image). These maps may represent low-level features found in the input image, such as edges and corners. The second convolution layer C2 of the CNN, which may extract 6 feature-maps from the previous layer, increases the semantic level of the extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully-connected (i.e., dense) layers and a final classification layer. The MLP uses the feature-maps from the last convolution layer in order to predict (recognize) for example the object class. For example, it may predict that the object in the image is a house.

The goal of a neural network is to transform the input data into a more useful output. One example is classification, where input data is classified into one of N possible classes (e.g., classifying if an image contains a cat or a dog).

Another example is regression, where input data is transformed into a Real number (e.g. determining the music beat of a song).

The power of neural networks comes from the internal representation which is built inside the layers. This representation is distributed among many units and is hierarchical, where complex concepts build on top of simple concepts. A neural network has two main modes of operation: training phase and testing phase. The training phase is the development phase, where the neural network learns to perform the final task. Learning may include iteratively updating the learnable parameters of the neural network, for example weights or connections between units. The testing phase is the phase in which the neural network performs the task. Learning can be performed in several ways. The main ones are supervised, unsupervised, and reinforcement learning. In supervised training, the neural network is provided with input-output pairs, where the output may be a label. In supervised training, the neural network is provided only with input data (and also with output raw data in case of self-supervised training). In reinforcement learning, the supervision is sparser and less precise; instead of input-output pairs, the neural network gets input data and, sometimes, delayed rewards in the form of scores (E.g., −1, 0, or +1).

The neural network may be trained on a training data set, which is supposed to be representative of the data on which the neural network will be used. During training, the neural network uses the examples in the training dataset to modify its learnable parameters (e.g., its connections' weights) in order to achieve the desired task. Input to the neural network is the data, and the output of the neural network represents the desired task. Examples of desired tasks are classification of objects in images, denoising of images (or other types of data, such as heart-rate signals), semantic segmentation. For such tasks, the output of the neural network may be a probability distribution over object classes for the whole image, a denoised image, a probability distribution over classes for each input pixel, respectively.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layers take input from units in one or more preceding layers, and provide output to one or more of following layers.

Initial layers (those close to the input data) extract semantically low-level features such as edges and textures in images, and intermediate and final layers extract more high-level features. After the feature extraction layers, there may be one or more layers performing a certain task, such as classification, semantic segmentation, object detection, denoising, style transfer, super-resolution etc. In recurrent neural networks, there is a feedback loop, so that the neural network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

One of the important properties of neural networks (and other machine learning tools) is that they are able to learn properties from input data, either in a supervised way or in unsupervised way. Such learning is a result of a training algorithm, or of a meta-level neural network providing the training signal. In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of the losses are mean squared error, cross-entropy, etc. In recent deep learning techniques, training is an iterative process, where at each iteration the algorithm modifies the learnable parameters of the neural network to make a gradual improvement of the neural network's output, i.e., to gradually decrease the loss.

Training a neural network is an optimization process, but the final goal is different from the typical goal of optimization. In optimization, the only goal is to minimize a functional. In machine learning, the goal of optimization or training process is to make the neural network learn the properties of the data distribution from a limited training dataset. In other words, the goal is to learn to use a limited training dataset in order to learn to generalize to previously unseen data, i.e. data which was not used for training a neural network. This is usually referred to as generalization. In practice, data is usually split into at least two sets, the training set and the validation set. The training set is used for training the neural network, i.e. to modify its learnable parameters in order to minimize the loss. The validation set is used for checking the performance of the neural network on data, which was not used to minimize the loss, as an indication of the final performance of the neural network. In particular, the errors on the training set and on the validation set are monitored during the training process to understand the following things:

- If the neural network is learning at all—in this case, the training set error should decrease, otherwise the neural network is in the regime of underfitting.
- If the neural network is learning to generalize—in this case, also the validation set error needs to decrease and to be not too much higher than the training set error. If the training set error is low, but the validation set error is much higher than the training set error, or it does not decrease, or it even increases, the neural network is in the regime of overfitting. This means that the neural network has just memorize the training set's properties and performs well only on that set, but performs poorly on a set not used for tuning its learnable parameters.

Lately, neural networks have been used for compressing and de-compressing data such as images. The most widely used architecture for such task is the auto-decoder, which is a neural network consisting of two parts: a neural encoder and a neural decoder. The neural encoder and the neural decoder operate with algorithms which are learned from data as discussed above. The neural encoder takes as input an image and produces a code which requires less bits than the input image. This code may have obtained by a binarization or quantization process after the neural encoder. The neural decoder takes in this code and reconstructs the image which was input to the neural encoder.

Such neural encoder and neural decoder may be trained to minimize a combination of bitrate and distortion, where the distortion is usually Mean Squared Error (MSE), Peak Signal-to-Noise Ratio (PSNR), Structural Similarity (SSIM), or similar. These distortion metrics are meant to be inversely proportional to the human visual perception quality.

When speaking of a video codec, a system comprising a video encoder and a video decoder is referred to. A video encoder transforms an input video into a compressed representation suited for storage/transmission and a video decoder uncompress the compressed video representation back into a viewable form. The video encoder may discard some information in the original video sequence in order to represent the video in a more compact form (that is, at lower bitrate).

A bitstream may be defined as a sequence of bits, which may in some coding formats or standards be in the form of a network abstraction layer (NAL) unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Hybrid video codecs, for example ITU-T H.263 and H.264 may encode the video information in two phases. Firstly, pixel values in a certain picture are (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction, the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The video decoder may reconstruct the output video by applying prediction means similar to the video encoder to form a predicted representation of the pixel blocks (using the motion or spatial information created by the video encoder and stored in the compressed representation) and prediction error decoding (inverse operation of the prediction error coding recovering the quantized prediction error signal in spatial pixel domain). After applying prediction and prediction error decoding means, the video decoder sums up the prediction and prediction error signals (pixel values) to form the output video frame. The video decoder (and video encoder) may also apply additional filtering means to improve the quality of the output video before passing it for display and/or storing it as prediction reference for the forthcoming frames in the video sequence.

In video codecs, the motion information is indicated with motion vectors associated with each motion compensated image block. Each of these motion vectors represents the displacement of the image block in the picture to be coded (in the video encoder side) or decoded (in the video decoder side) and the prediction source in one of the previously coded or decoded pictures. In order to represent motion vectors efficiently, those may be coded differentially with respect to block specific predicted motion vectors. In video codecs, the predicated motion vectors may be created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of the previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In video codecs, the prediction residual after motion compensation may be first transformed with a transform kernel (like DCT) and then coded. The reason for this is that often there still exists some correlation among the residual and transform can in many cases help reduce this correlation and provide more efficient coding.

Video encoders may comprise rate-distortion optimization e.g. for coding mode and parameter selection, where an amount of distortion is optimized against the amount of bitrate in a weighted manner. In practice, video encoders may utilize Lagrangian cost functions to find optimal coding modes, e.g. the desired mode for a block (e.g. among modes of an intra-coded block and inter-coded block) and parameters for the selected mode, such as associated motion vectors for an inter-coded block. This kind of cost function uses a weighting factor λ to tie together the (exact or estimated) image distortion due to lossy coding methods and the (exact or estimated) amount of information that is required to represent the pixel values in an image area:

$$C=D+\lambda R$$

where C is the Lagrangian cost to be minimized, D is the image distortion (e.g. Mean Squared Error) with the mode and motion vectors considered, and R is the number of bits needed to present the required data to reconstruct the image block in the decoder (including the amount of data to represent the candidate motion vectors).

Figure 2:
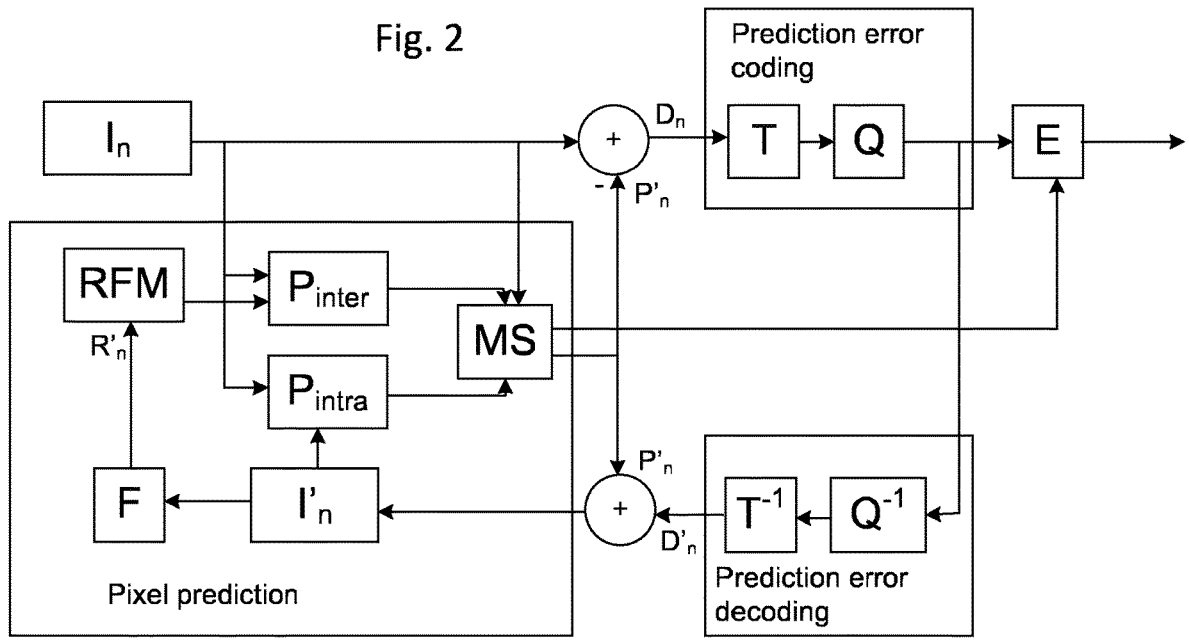
FIG. 2 shows an example of a encoding process.
Figure 3:
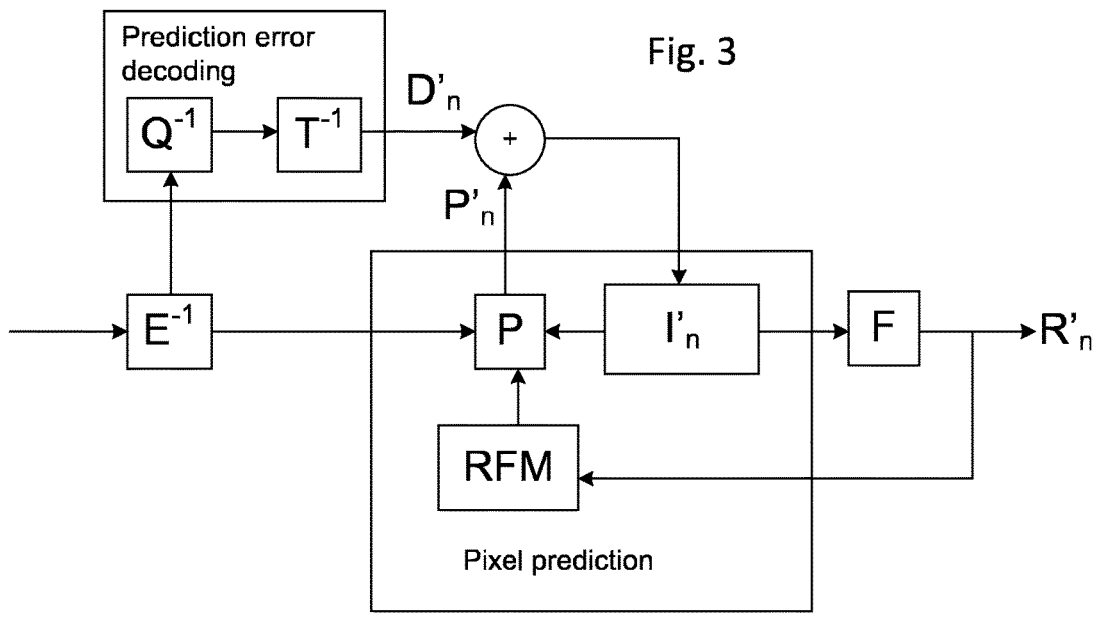
FIG. 3 shows an example of a decoding process.

The video material captured or generated by any of the image sources can be provided for an encoder that transforms an input video into a compressed representation suited for storage/transmission. The compressed video is provided for a decoder that can uncompress the compressed video representation back into a viewable form. The encoder may be located in the image sources or in the server. The decoder may be located in the server or in the viewer, such as a HMD. The encoder may discard some information in the original video sequence in order to represent the video in a more compact form (that is, at lower bitrate). An example of an encoding process is illustrated in FIG. 2. FIG. 2 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$), mode selection (MS) and filtering (F). An example of a decoding process is illustrated in FIG. 3. FIG. 3 illustrates a predicted representation of an image block ($P'_n$); a reconstructed prediction error signal ($D'_n$); a preliminary reconstructed image ($I'''$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Conventionally, the filtering in video codecs may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

An example of SAO is given next with reference to the High Efficiency Video Coding standard (HEVC); however, SAO can be similarly applied to other coding schemes too. In SAO, a picture is divided into regions where a separate SAO decision is made for each region. In HEVC, the basic unit for adapting SAO parameters is a coding tree unit, CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

As mentioned, image and video codecs may use a set of filters to enhance the visual quality of the predicted visual content and can be applied either in-loop or out-of-loop, or both. In the case of in-loop filters, the filter applied on one block in the currently-encoded frame will affect the encoding of another block in the same frame e. An in-loop filter can affect the bitrate and/or the visual quality. In fact, an enhanced block may cause a smaller residual (difference between original block and predicted-and-filtered block) because it will affect the (intra or inter) prediction of other blocks, thus requiring less bits to be encoded. The result of applying an out-of-the loop filter will not affect the residual of other blocks, and thus it may only impact the visual quality of the filtered blocks.

A neural network (NN) filter may be used in addition to one or more other filters in video codecs (either in sequence or in parallel, or both) or may be used instead of other filters in video codecs, where the other filters may include but are not limited to one or more of the following: a deblocking filter, an SAO filter, and an adaptive loop filter. Neural networks may be trained based on a certain dataset. Datasets may be biased and may not represent well the real distribution of data in real life. As a consequence, a neural network performing a filtering operation may not always perform optimally and sometimes it may occur that a conventional filter may perform better. In other cases, it may happen that the input to the NN filter is a better block (with respect to some quality or rate-distortion metric, such as PSNR or Bjontegaard delta-rate) than the output of the NN filter (or, in other words, the NN filter does not enhance the input block).

Thus a video codec may use a mechanism by which the NN filter is either enabled or disabled. The decision is made at the video encoder side, for example on a block basis, based for example on rate-distortion optimization or based on the output of another neural network. The decision may simply consist of ON/OFF signals. These ON/OFF signals can be included into the bitstream, for example by first entropy-coding them. This bitrate overhead may be even more impactful to the final bitrate for the smaller block sizes when the decision information is encoded for each block.

According to the present embodiments the activation and the deactivation of a NN filter may be done by using a switch. The decision about the activation of the NN filter may be done at video encoder side. The decision about the activation or deactivation may be performed e.g. on a block basis, in which case the switch may change its state (from activation to deactivation or vice versa) as often as in each block. The information about the activations/deactivations (ON/OFF) of the NN filter may be leveraged to reduce the bitrate needed to compress and/or transmit subsequent ON/OFF signaling to the video decoder. In fact, this corresponds to leveraging knowledge about when the NN filter performed well and when it performed bad. In addition or alternatively, the information about the activation/deactivation (ON/OFF) of the NN filter may be leveraged to improve the NN filter.

The present embodiments relate to two different methods, which are not necessarily alternatives to each other:
  First method is targeted to improve the NN filters. The first method can be implemented in any of the following ways: based on reconstruction loss; based on adversarial loss; no-finetuning.
  Second method is targeted to learn a neural network switch for filters.

The methods are discussed in the following in a more detailed manner. For the purpose of the detailed description, compression and decompression of a video data are given as examples.

It is assumed that both the video encoder and the video decoder have sufficient computational, memory and power capabilities to run one or more neural networks or other learning-based algorithms. In some embodiments, only inference (one forward pass) may be needed, whereas in some other embodiments, both training (one or more pairs of forward and backward passes) and inference may be needed.

It is also assumed that filtering is performed by using at least one NN filter. As mentioned, this NN filter is activated or deactivated (ON or OFF) based on the operation of a switch. The switch is controlled by a decision made at video encoder-side, e.g. by one or more of the following processes:

Rate-distortion optimization: the video encoder decided the ON/OFF decision which maximizes the rate-distortion trade-off.
  Neural network decisions: a separate neural network is utilized to output the best ON/OFF decision, based on for example a prediction of its effect to the rate-distortion trade-off. The neural network may be pre-trained prior to deployment in the codec.

In the following, several embodiments are discussed with reference to FIGS. 4 to 14. It is appreciated that the figures comprises processing blocks that refer to conventional encoding and decoding processing blocks, as illustrated in and discussed with reference to FIGS. 2 and 3, respectively. Such processing blocks are for example prediction error computation 10, transform and quantization 20, inverse quantization and transform 30, entropy encoding/decoding 40, reconstructed prediction error signal 50, reconstruction 60, predictor 70. These processing blocks are included in each of the embodiments of FIGS. 4 to 14, and are not discussed any further, since the emphasis is given to the filtering operation.

Figure 4:
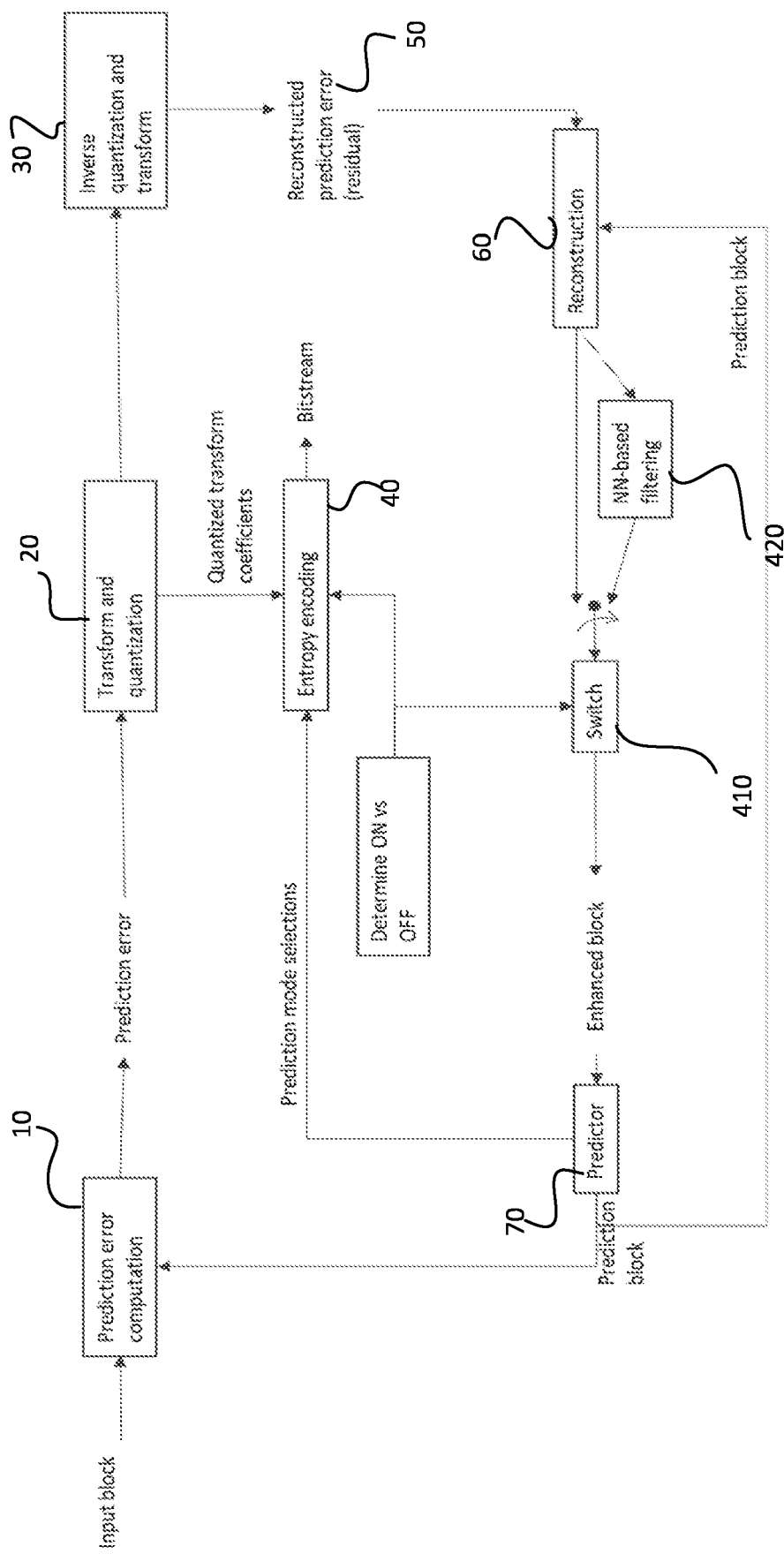
FIG. 4 shows an encoding process according to an embodiment.

FIG. 4 illustrates an example of an encoding process. In this example, when the switch 410 is OFF, the NN filter 420 is deactivated and the input to the NN filter 40 is used instead of the output of the NN filter 420 (so, the NN filter is bypassed).

Figure 5:
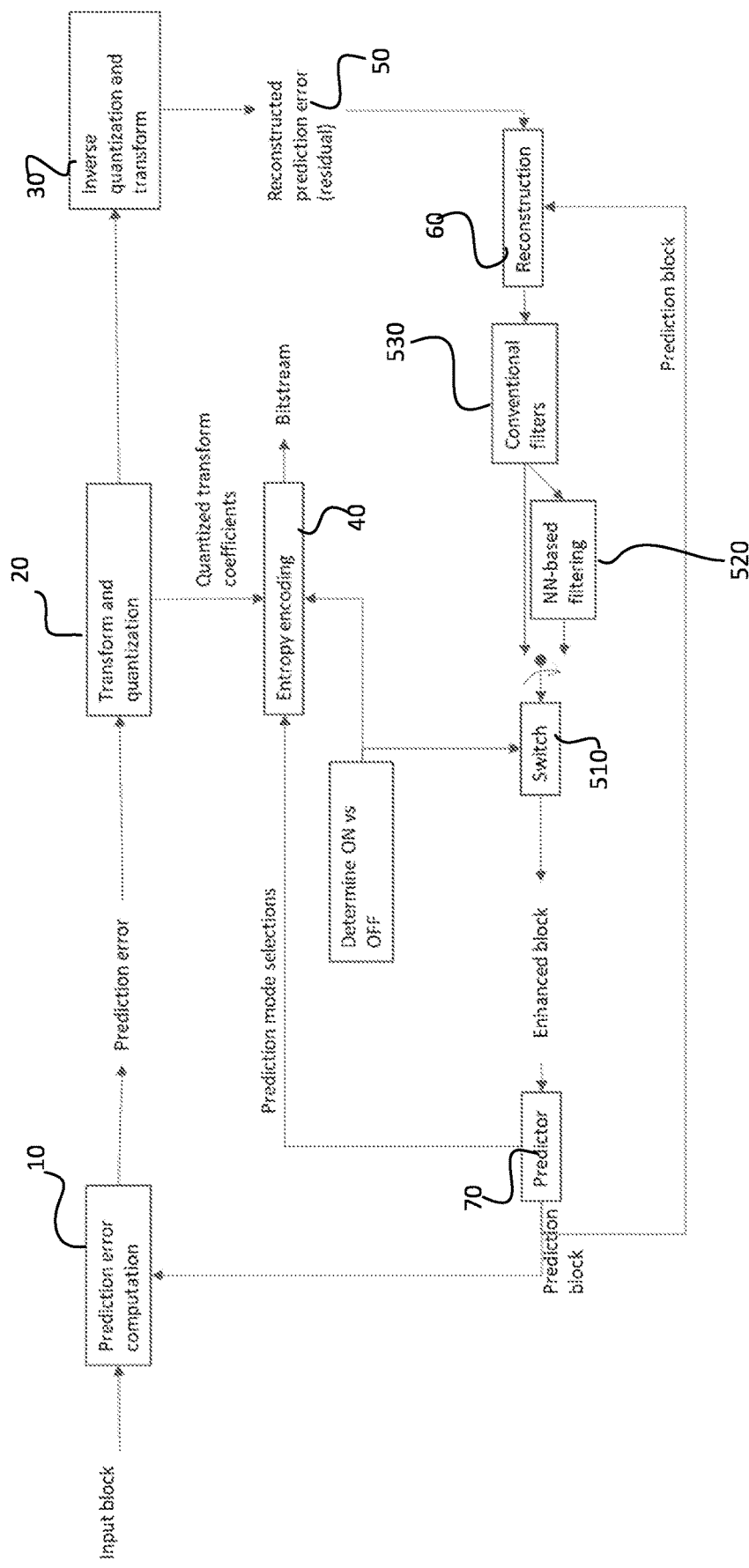
FIG. 5 shows an encoding process according to another embodiment.

As shown in an example of FIG. 5, there may be additional filters 530, for example, other neural network based filters and/or conventional filters. In the example of FIG. 5, the additional filters 530 are operating in cascade (i.e., sequentially) with respect to the NN filter 520 under consideration for the present embodiments. In the sequential case, switching the NN filter 520 off corresponds to bypassing the NN filter 520. The input to the NN filter 520 may come from previous filters 530 (conventional or not).

Figure 6:
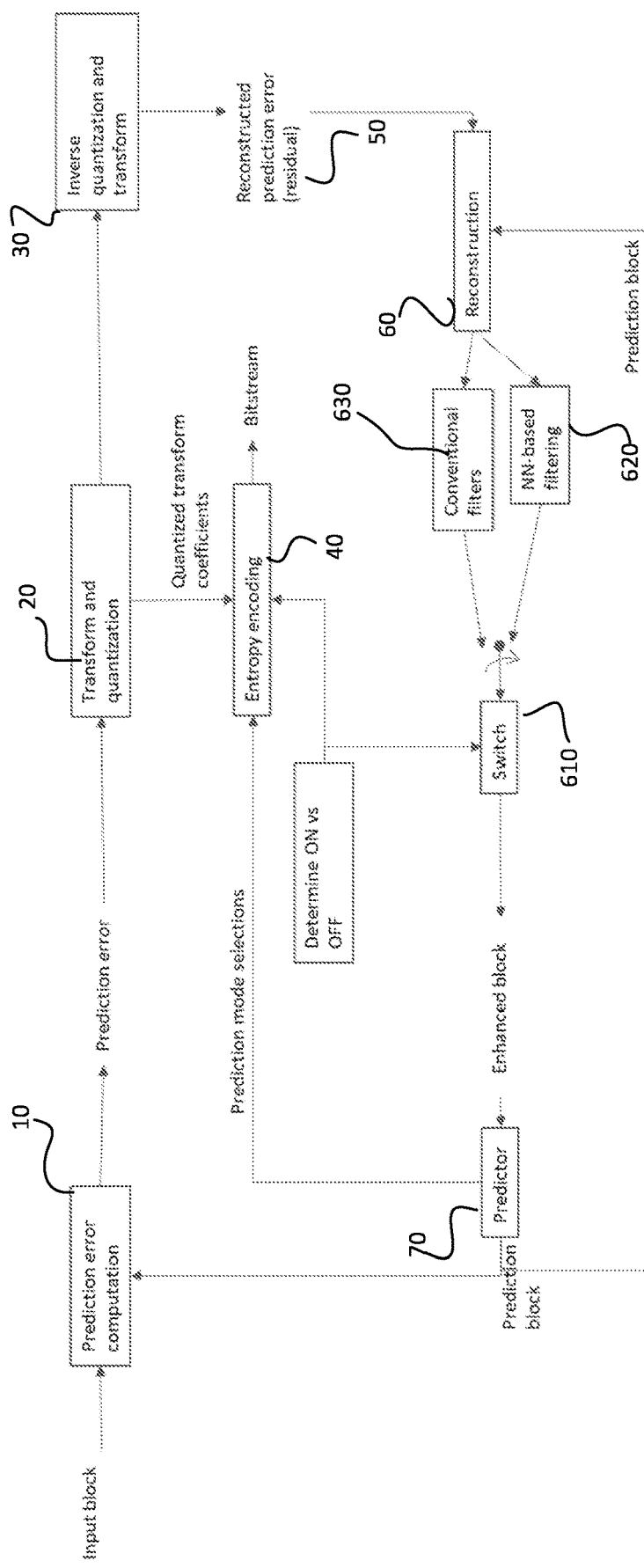
FIG. 6 shows an encoding process according to yet another embodiment.

FIG. 6 illustrates an alternative example, where the NN filter 620 and the conventional filters 630 are in parallel. In this case, the NN filter 620 and the parallel conventional filters 630 may be mutually exclusive (thus switching the NN filter 620 off corresponds to switching the other branch on).

Figure 7:
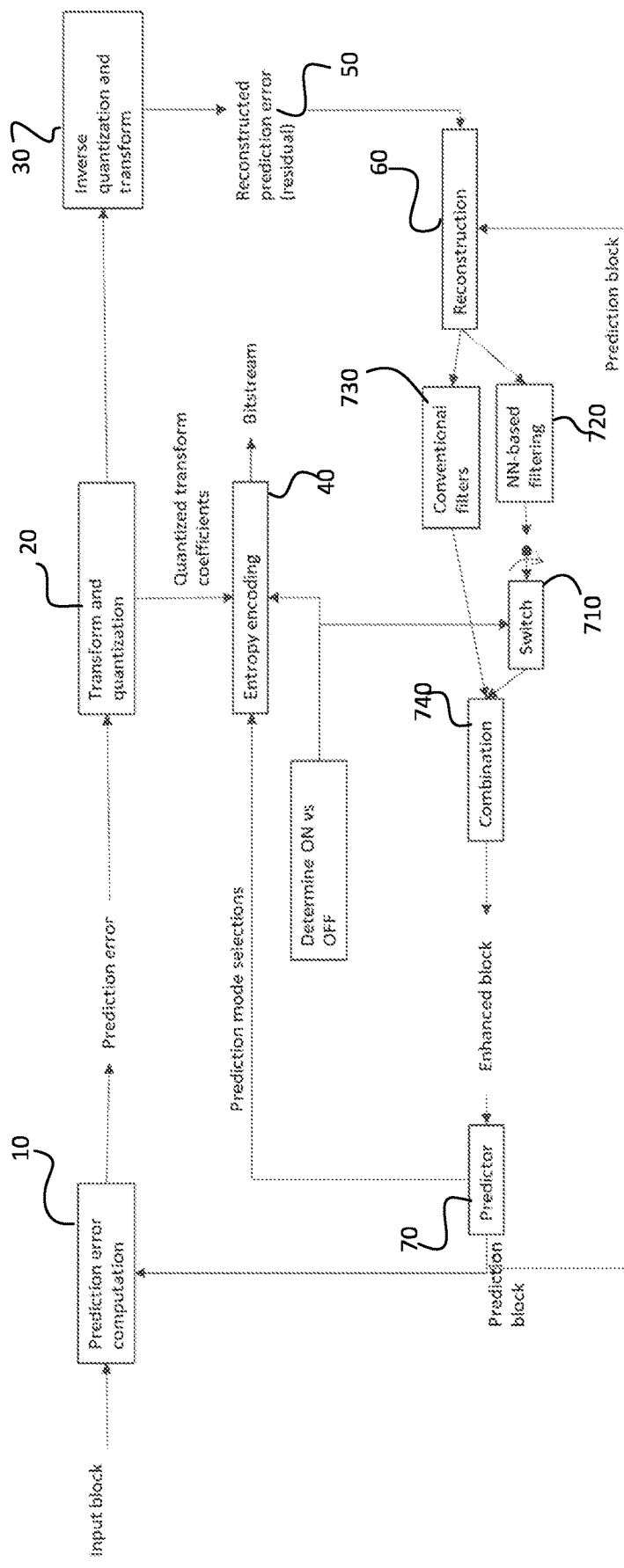
FIG. 7 shows an encoding process according to yet another embodiment.

FIG. 7 illustrates another example of the parallel configuration, where the outputs of the NN filter 720 and of the parallel conventional filters 730 are combined for example by linear combination 740 with previously-determined weighting coefficients (thus switching the NN filter 720 off corresponds to setting the weighting coefficients of the NN filter 720 to zero).

Figure 8:
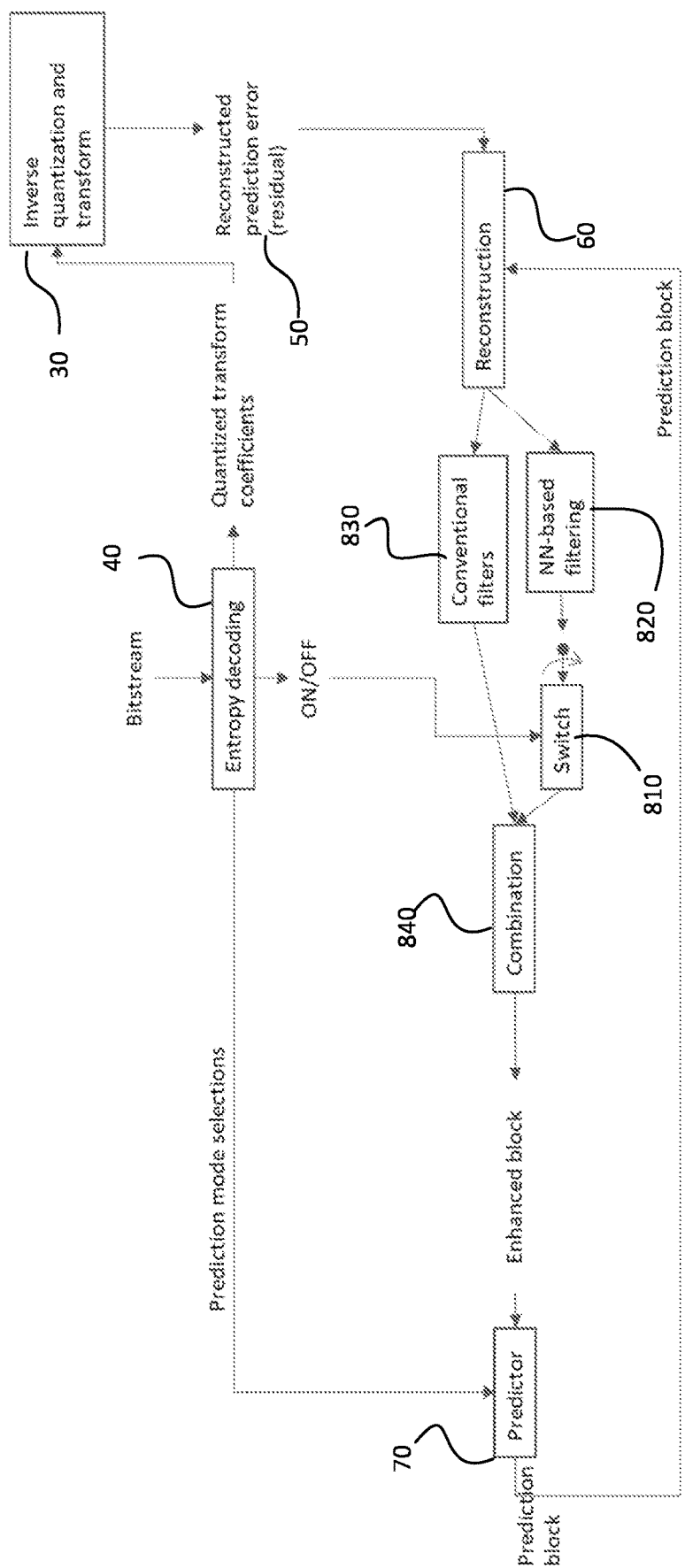
FIG. 8 shows a decoding process for the encoding process of FIG. 5, according to an embodiment.

FIG. 8 illustrates an example of the decoding process for the encoding process shown in FIG. 7, i.e. where NN filter 820 and conventional filters 830 are parallel, and their outputs are combined by linear combination 840.

The ON/OFF decisions may be different for each sub-block, for each block, for a set of blocks, for each frame, for a set of frames, for a video, or for a set of videos. Any combination of these options is also possible and thus, to be included in the scope of the present embodiments.

In a simple case, ON/OFF information may be included into the bitstream for each block, such as for each prediction unit or block, or for each coding unit or block (which may correspond to the block size inherently output by the inverse quantization and transform process), or for each coding tree unit or block, e.g. as defined in the H.265/HEVC standard or the H.266/VVC standard.

The ON/OFF decisions made at video encoder side need to be signaled to the video decoder so that the switch at video decoder side is operated in the same way as at the video encoder side. This is done by including the ON/OFF decisions into the encoded bitstream. In order to decrease the bitrate required by these decisions, predictive coding may be utilized, where the ON/OFF decision for a certain block is predicted for example based on the ON/OFF decision made for one or more of the previously-decoded blocks. Then, only the ON/OFF prediction residual (error) needs to be encoded. In addition or alternatively, entropy coding based lossless coding may be used for decreasing the bitrate. For example, context-based binary arithmetic coding (CABAC) may be used for entropy coding. In the entropy coding, a context neural network that is adapted based on the ON/OFF decision of the previously (de)coded blocks may be used. For example, the context may use the ON/OFF decisions of the spatially adjacent previously (de)coded blocks.

The First Method: Improve Neural Network Filter:

In this embodiment, the NN filter is improved by leveraging the ON/OFF decisions made for previously-decoded blocks (or sub-blocks, or frames—this depends on which granularity the ON/OFF decisions are made).

The assumption here is that a certain block is highly correlated with nearby blocks (nearby in either or both spatial and/or temporal dimensions). Thus a ON/OFF decision for nearby blocks may be used to learn what was done correctly and what was not done correctly by the NN filter in those nearby blocks, and act accordingly in the current block.

For this embodiment, there are three different implementations:

Implementation 1: Reconstruction Loss

Figure 9:
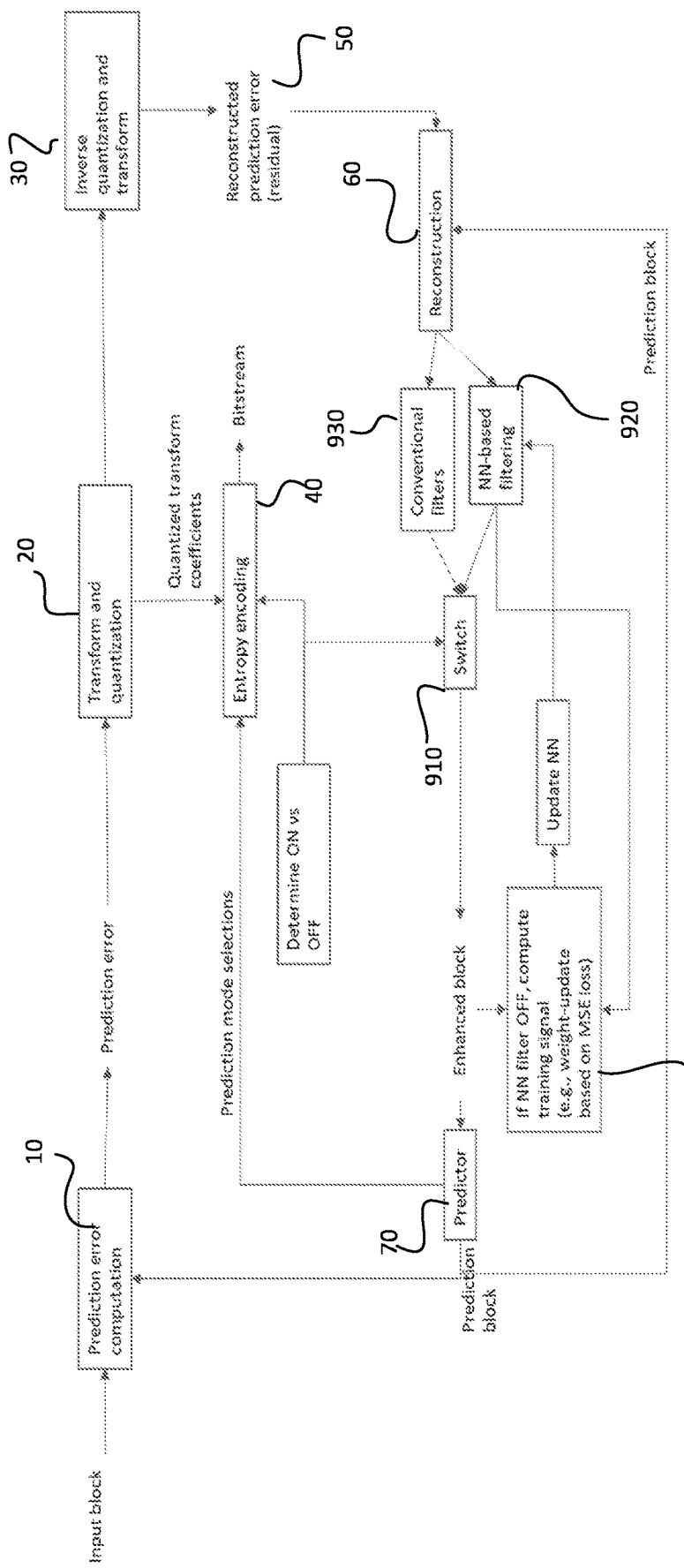
FIG. 9 shows an encoding process according to a first embodiment for a first method.

FIG. 9 illustrates an encoding process for the first embodiment of the first method.

The NN filter 920 is fine-tuned by using the nearby blocks for which the decision was OFF for the NN filter 920. The fine-tuning consists of one or more training iterations 950. The training iteration(s) 950 may be performed with a sufficiently small learning rate (such as 0.0001). The input to the NN filter 920 are the input blocks for those selected nearby blocks (which were OFF), and the ground-truth used in the training iteration(s) are the corresponding blocks which were used instead of the output of the NN filter 920. For example, for the case where NN filter 910 is used in parallel with a conventional filter 930, the ground-truth is the output of the conventional filter 930. The NN filter may be updated by using one of the suitable optimizers for neural network training, such as Adam, SGD (Stochastic Gradient Descent), etc., whose task is to reduce or minimize the training loss. The training loss objective may be one of the suitable objectives for training neural networks for regression tasks, such as Mean Squared Error (MSE). In case of using the MSE as a loss, this can be used as follows: MSE(NN_filter_out, conv_filter_out), where NN_filter_out is one or more blocks output by NN filter when NN filter is OFF (i.e., when NN_filterout is not selected by the switch), and conv_filter_out is the corresponding output of the conventional filters. This fine-tuning process can be done for example for a certain predetermined number of iterations, or until a stopping criterion is met, such as when the training loss (for example, the MSE) has decreased by a certain amount or percentage.

The set of the nearby blocks from which the nearby blocks for which the decision was OFF for the NN filter 920 are selected may be determined in, but is not limited to, one of the following ways or their combination:

A spatial range of nearby blocks relative to the current block is pre-determined e.g. in a coding standard, or determined and indicated in or along a bitstream e.g. by an encoder, or decoded from or along a bitstream e.g. by a decoder. For example, a spatial range may be expressed as a horizontal range and/or a vertical range and any block at least partially within the spatial range may be determined to be within the set of nearby blocks.

A set of nearby blocks is pre-determined e.g. in a coding standard, or determined and indicated in or along a bitstream e.g. by an encoder, or decoded from or along a bitstream e.g. by a decoder to comprise blocks that share boundary with the current block.

A temporal range of nearby blocks is pre-determined e.g. in a coding standard, or determined and indicated in or along a bitstream, or decoded from or along a bitstream e.g. by a decoder. For example, a temporal range may be expressed as a number of pictures preceding the current picture in output order and/or a number of pictures succeeding the current picture in output order.

A temporal range of nearby blocks derived from available reference pictures in a way pre-determined e.g. in a coding standard, or determined and indicated in or along a bitstream e.g. by an encoder, or decoded from or along a bitstream e.g. by a decoder, or a combination thereof. For example, a temporal range may be pre-determined to comprise the reference pictures available for encoding or decoding the current picture (e.g. marked as "used for reference" for the current picture). In another example, a temporal range is expressed as index(es) of a reference picture list for the current picture or slice, where the index(es) are pre-determined e.g. in a coding standard, or determined and indicated in or along a bitstream e.g. by an encoder, or decoded from or along a bitstream e.g. by a decoder.

A temporal range for a block comprises the reference picture(s) indicated to be used for predicting the current block.

Any above-mentioned method to select spatially nearby blocks may be used in the current picture.

Any above-mentioned method to select spatially nearby blocks may be used in pictures within the temporal range of nearby blocks. The selection of the spatially nearby blocks may be adjusted to appear in the proximity of the location or block derived from motion vector(s) of the current block.

The fine tuning described above may be limited to take place in selected pictures and/or blocks only. For example, certain pictures and/or blocks may be coded with a higher picture quality than other pictures and/or blocks and thus selected to be subject to be used as input for the fine tuning. According to an embodiment, a video encoder and a video decoder use a pre-defined algorithm (specified e.g. in a coding standard) in determining which pictures and/or blocks are subject to be used as input for the fine tuning. For example, it may be specified that only intra random access point (IRAP) picture are subject to be used as input for the fine tuning. In another example, it may be specified that only blocks for which the base quantization parameter is applied without any additional positive quantization parameter offsets are subject to be used as input for the fine tuning. According to another embodiment, an encoder indicates in or along the bitstream and/or a decoder decodes from or along the bitstream which picture and/or blocks are subject to be used as input for the fine tuning.

Figure 10:
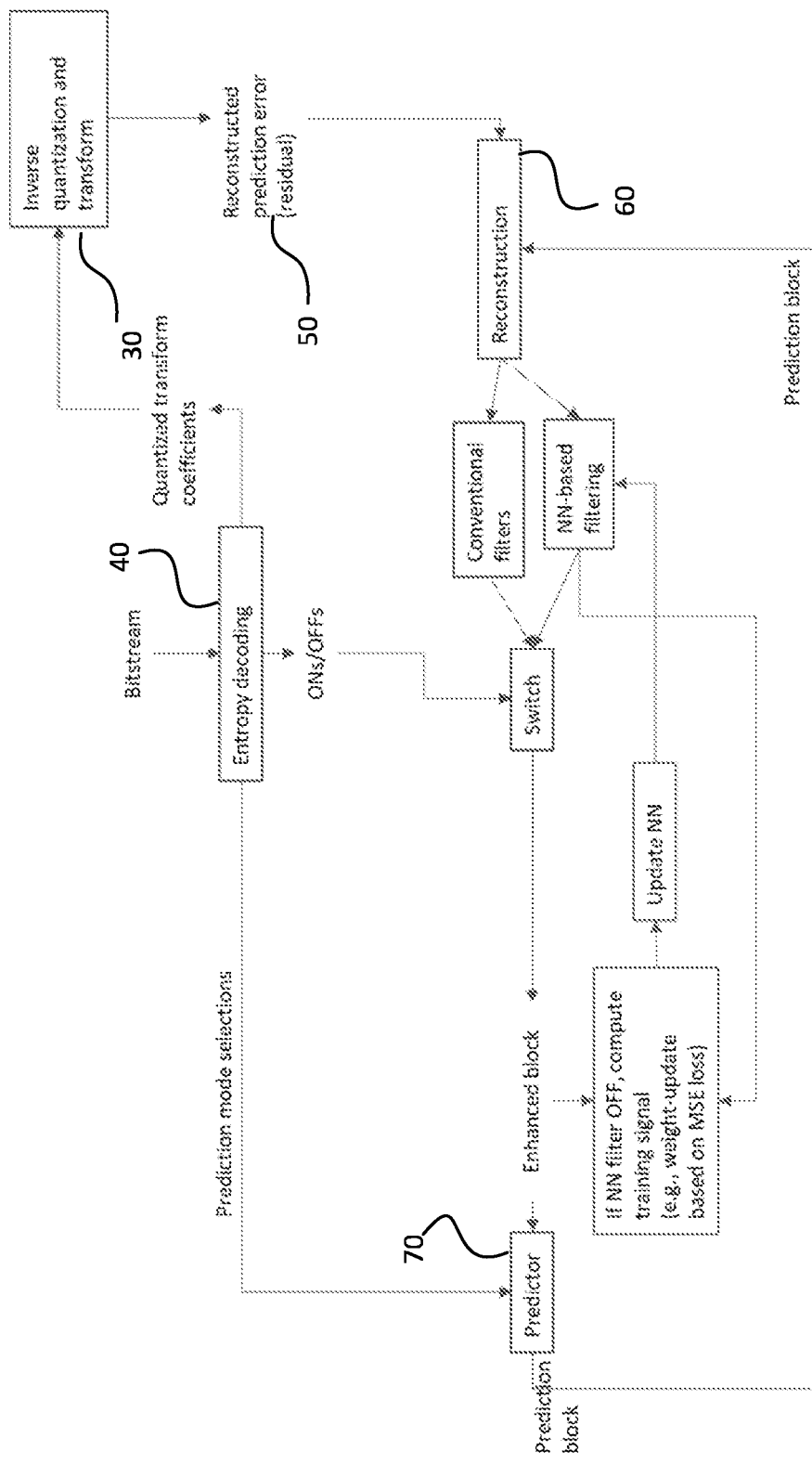
FIG. 10 shows a decoding process for the encoding process of FIG. 7, according to an embodiment.

FIG. 10 illustrates a decoding process for the encoding process of FIG. 9.

In an alternative embodiment, in order to avoid that the NN filter "forgets" what it was originally trained for, the fine-tuning is performed by using also the blocks for the cases when NN filter was activated (ON). In this case, the ground-truth is the output of the NN filter for those previously-decoded blocks when NN filter was ON.

Implementation 2: Adversarial Loss

Figure 11:
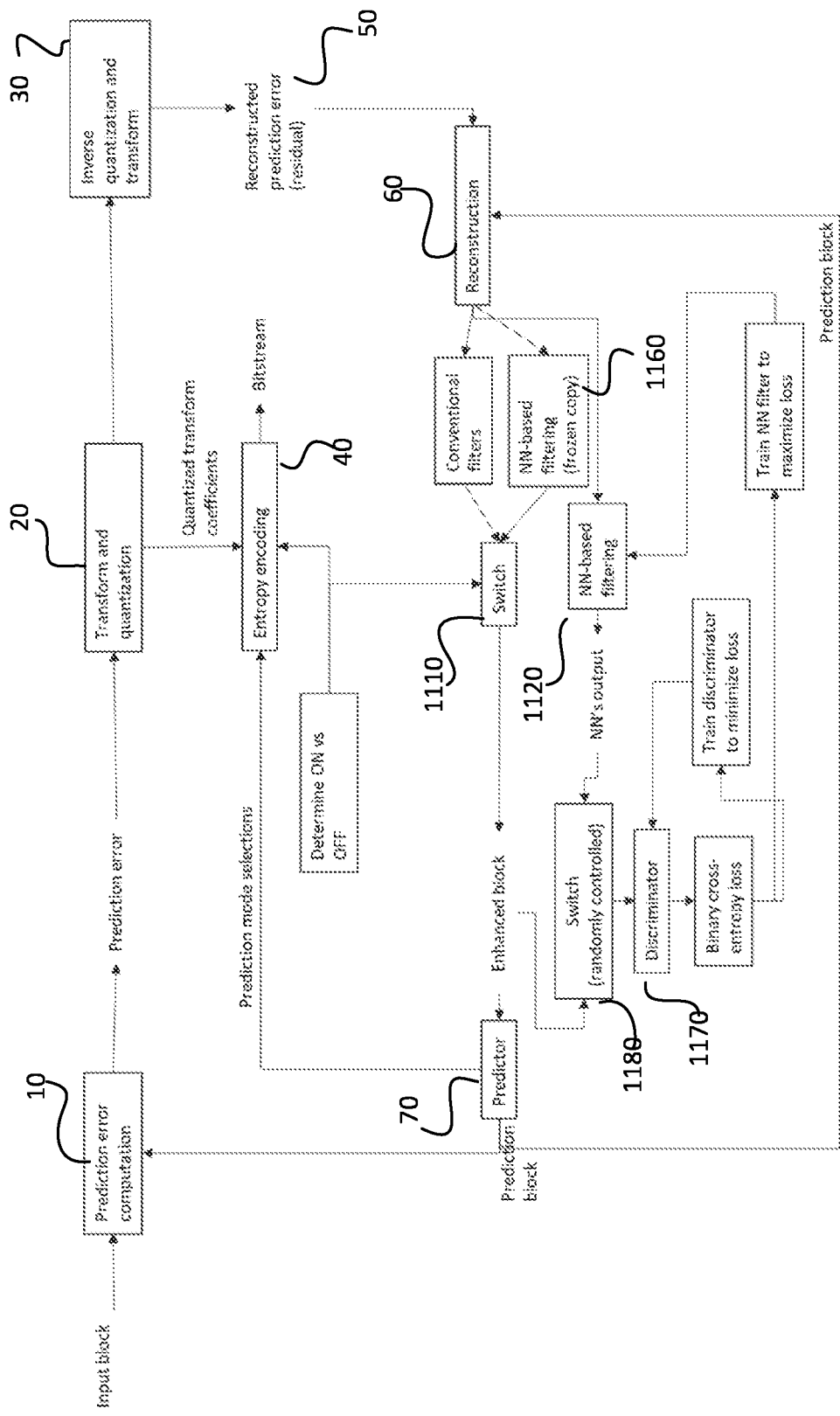
FIG. 11 shows an encoding process according to a second embodiment for a first method.

FIG. 11 illustrates an encoding process for the second embodiment of the first method In order to reduce the possibility that the NN filter 1120 forgets what it was originally trained for, and that at the same time it learns from the OFF decisions, adversarial game (similar to those used in Generative Adversarial Networks, but with some modifications especially to how the ground-truth is provided to the discriminator) may be used.

In this implementation, a fine-tuning process is performed, thus the NN filter 1120 is subject to one or more training iterations. An additional neural network may be utilized, referred to as the discriminator 1170, which may be pretrained prior to the deployment into the video codec.

The discriminator 1170 gets as input either the output of the NN filter 1120 being fine-tuned or the ground-truth by using a second switch 1180 which may be for example controlled by a random decision generator. The goal of the discriminator 1170 is to guess correctly whether the input is the NN filter's 1120 output or the ground-truth. For this implementation, two copies of the NN filter are used. One copy 1120 is the NN filter version which is being fine-tuned. Another copy 1160 is the NN filter version which is kept as frozen (i.e., it is kept in its original state before fine-tuning is performed). The ground-truth is defined as either the NN filter's 1160 output or the alternative data (i.e., the data which is used in place of the NN filter's 1160 output when the NN filter 1160 is OFF). Importantly, the NN filter's 1160 output which is used as one of the two possibilities for the ground-truth is actually output by the "frozen" NN filter 1160 (i.e., by the original NN filter 1120 before fine-tuning). The decision whether the ground-truth is the NN filter's 1160 output or the alternative data is done based on the switch controlled by the ON/OFF decisions made at video encoder side.

The goal of the NN filter 1120 being trained is to fool the discriminator 1170, i.e., make it believe that the input to the discriminator 1170 is the ground-truth when in reality it is the output of the NN filter 1120 being trained. The training consists of updating the learnable parameters of the discriminator 1170 in order to improve it to guess correctly whether the input comes from the ground-truth (frozen NN filter 1160 or alternative data) or from the NN filter 1120 being finetuned. In addition, the training consists of updating the learnable parameters of the NN filter 1120 being fine-tuned in order to improve it to fool the discriminator 1170.

By this training, the NN filter 1120 is fine-tuned to generate outputs which are not distinguishable from the alternative data. After this process is completed (e.g., after a certain stopping criterion for the training is met), the fine-tuned NN filter 1120 will replace the NN filter 1160. A stopping criterion may be pre-defined e.g. in a coding standard, or may be determined and indicated in or along a bitstream e.g. by an encoder, or may be decoded from or along a bitstream e.g. by a decoder.

Implementation 3: No Finetuning

Figure 12:
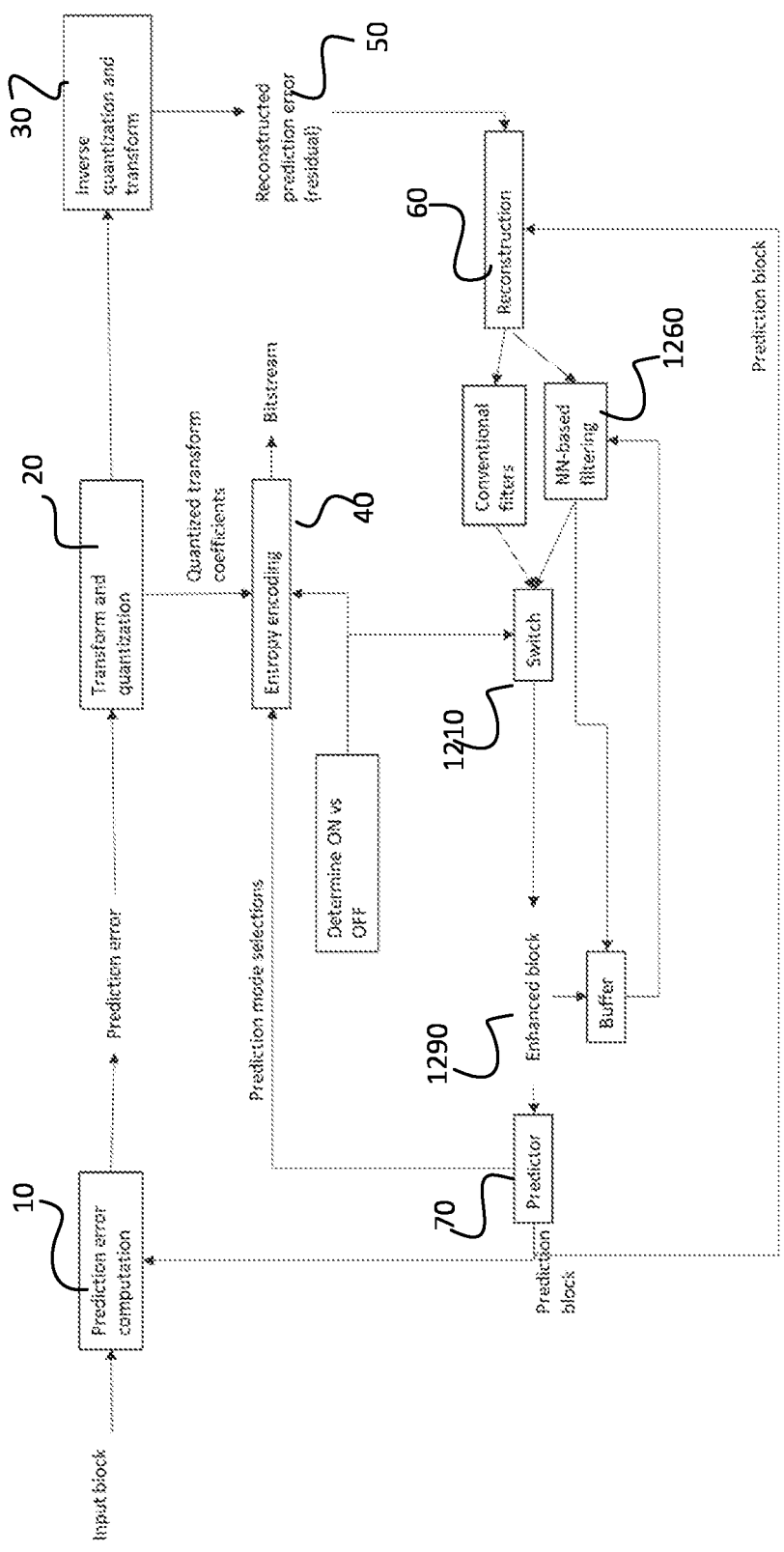
FIG. 12 shows an encoding process according to a third embodiment for a first method.

FIG. 12 illustrates the third embodiment of the first method.

In this implementation, the NN filter 1260 is not subject to training iterations. Instead, there are extra inputs to the NN filter 1260, and these are one or more previously-decoded blocks 1290 in two versions: the version, which was input to the NN filter 1260, and the version which was used in place of the NN filter 1260 when the NN filter 1260 was OFF.

According to another embodiment of this implementation, the extra input may consist of one or more previously-decoded blocks in two versions: the version, which was output by the NN filter 1260, and the version which was used in place of the NN filter 1260 when the NN filter was OFF:

According to another embodiment of this implementation, the extra input may consist of one or more previously-decoded blocks in the following two versions: the version which was input to the NN filter 1260, and the version which was used in place of the NN filter 1260 (if the NN filter was OFF) or which was output by the NN filter 1260 (if the NN filter was ON).

In another embodiment of this implementation, the extra input may consist of one or more previously-decoded blocks in the following two versions: the version which was output by the NN filter 1260, and the version which was used in place of the NN filter 1260 (if the NN filter was OFF) or which was output by the NN filter 1260 (if the NN filter was ON).

In another embodiment of the implementation, the extra input may consist of the residual or difference of one or more previously-decoded blocks between the following two versions: the version which was output by the NN filter 1260, and the version which was used in place of the NN filter 1260 (if the NN filter was OFF) or which was output by the NN filter 1260 (if the NN filter was ON).

Figure 13:
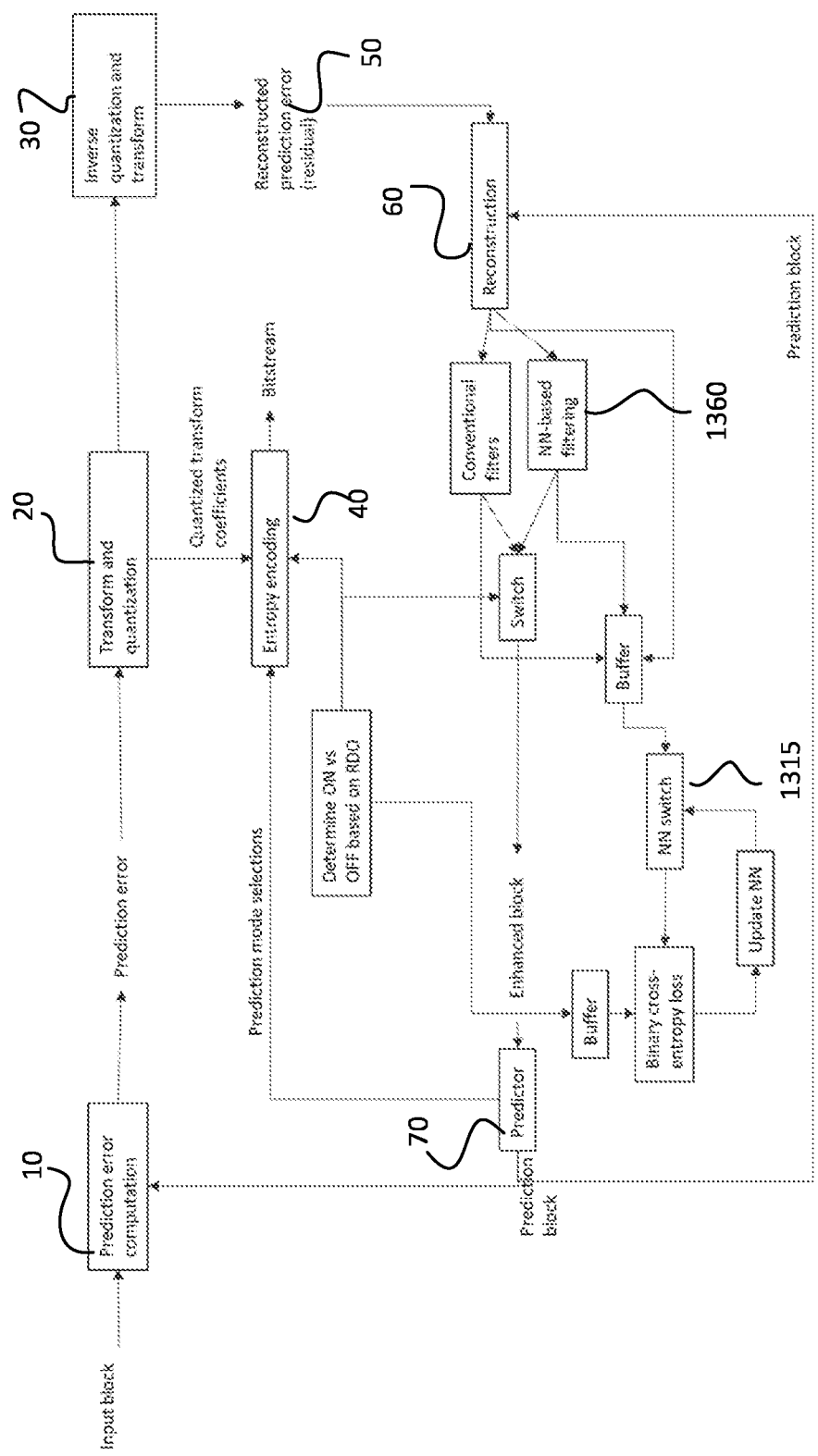
FIG. 13 shows a training phase according to a second method.

The Second Method: Learn a Neural Network Switch for Filters:

FIG. 13 illustrates the second method for the training phase using the previously-decoded blocks.

In this method, the NN filter 1360 is not modified or fine-tuned. Instead, a separate neural network 1315 is trained to perform the decisions about switching the NN filter 1360 on or off.

The training is performed based on the information from one or more previously-decoded blocks. The ON/OFF decision made by the video encoder for one or more previously-decoded blocks are used as ground-truth for training.

The NN switch 1315 may be a binary classifier. An example architecture may be a sequence of convolutional layers and non-linearity layers (e.g., convolutional layer, non-linearity layer, convolutional layer, non-linearity layer, etc., where the non-linearity may be a rectified linear unit activation function), followed by a sequence of fully-connected layers, where the final fully-connected layer may map its input to a single scalar output value, and a sigmoid activation.

The training loss may be the binary cross-entropy loss. Other suitable losses may be used.

According to an embodiment, the training operation of the NN switch 1315 may be done offline on a sufficiently big dataset. In this case, ON/OFF signaling may be needed only for the cases where the NN switch 1315 fails (the video encoder has a NN switch too, and its output will be compared to the Rate-Distortion Optimization (RDO)-based decision). For example, the ON/OFF signaling may be performed by an encoder (and consequently included in a bitstream), or decoded from a bitstream by a decoder only when a classification confidence or alike of the output of the NN switch 1315 is below a threshold, which may be pre-determined e.g. in a coding standard, or indicated in or along a bitstream e.g. by an encoder, or decoded from or along a bitstream e.g. by a decoder. As described earlier, the ON/OFF signalling may be entropy-coded by an encoder into the bitstream and/or entropy-decoded by a video decoder from the bitstream.

According to an alternative embodiment, the training or fine-tuning is done online (during encoding and decoding process). The following is an example for the case where intra prediction is being performed on the blocks taken as an example. The blocks reconstructed have an associated ON/OFF signal which is entropy-coded by a video encoder into the bitstream and/or entropy-decoded by a video decoder from the bitstream. The NN switch 1315 can be trained on this data and then applied on the currently-predicted block. According to an embodiment, a video encoder indicates in or along the bitstream and/or a video decoder decodes from or along the bitstream, when ON/OFF signaling is no longer present as an entropy-coded indication in the bitstream and instead the NN switch 1315 is used.

In combination with either offline training or online training as described in the embodiments above, there are various embodiments on how ON/OFF signaling and the output of the NN switch 1315 can be jointly handled, including the following and their combinations:

According to an embodiment, the ON/OFF signaling is performed by an encoder (and consequently included in a bitstream), or decoded from a bitstream by a decoder only when a classification confidence or alike of the output of the NN switch 1315 is below a threshold, which is pre-determined e.g. in a coding standard, or indicated in or along a bitstream e.g. by an encoder, or decoded from or along a bitstream e.g. by a decoder.

According to an embodiment, the NN switch 1315 generates a prediction of the ON/OFF signaling. A signal that undergoes the entropy (de)coding instead of the ON/OFF signals is derived as a difference between the predicted ON/OFF signal and encoder's choice for ON/OFF. For example, if the predicted signal and the encoder's choice are the same (e.g. both are ON), the difference signal that is encoded may be determined to have value 0 and otherwise it may be determined to have value 1. Since the difference signal is entropy (de)coded with context-based entropy (de)coding, the bitrate of the signal indicating the prediction to be identical to the encoder's choice is likely to be smaller than the bitrate of the signal indicating the prediction to differ from the encoder's choice.

According to an embodiment, the confidence or alike that the NN switch 1315 outputs with the predicted ON/OFF signal is used as a probability or alike in entropy (de)coding. Arithmetic (de)coding may be used in (de)coding the ON/OFF signal, thus indicating a decision for ON/OFF that has a high confidence or alike as determined by the NN switch 1315 causes a very small bitrate impact.

Figure 14:
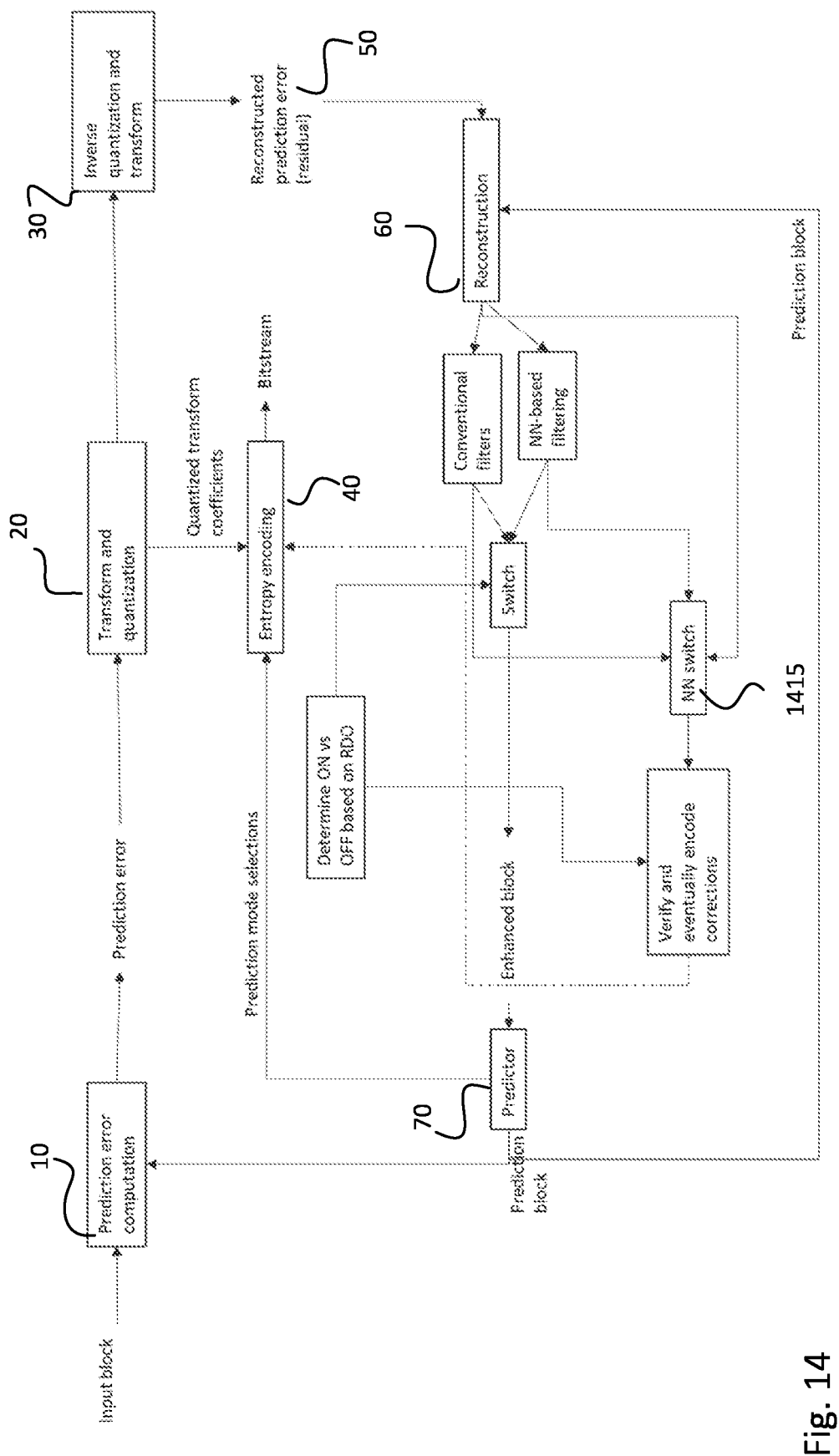
FIG. 14 shows an example of a encoding process based on training shown in FIG. 13.

FIG. 14 illustrates how the neural network switch 1415 which was trained or finetuned on previously-decoded blocks is used with respect to the current block. In particular, the output of the finetuned NN switch 1415 is verified/evaluated (by comparing it to the ground-truth ON/OFF decisions, for example those decisions made based on RDO). If the NN switch's 1415 output is wrong, a correction will be included into the bitstream, for example the ground-truth ON/OFF decision.

Figure 15:
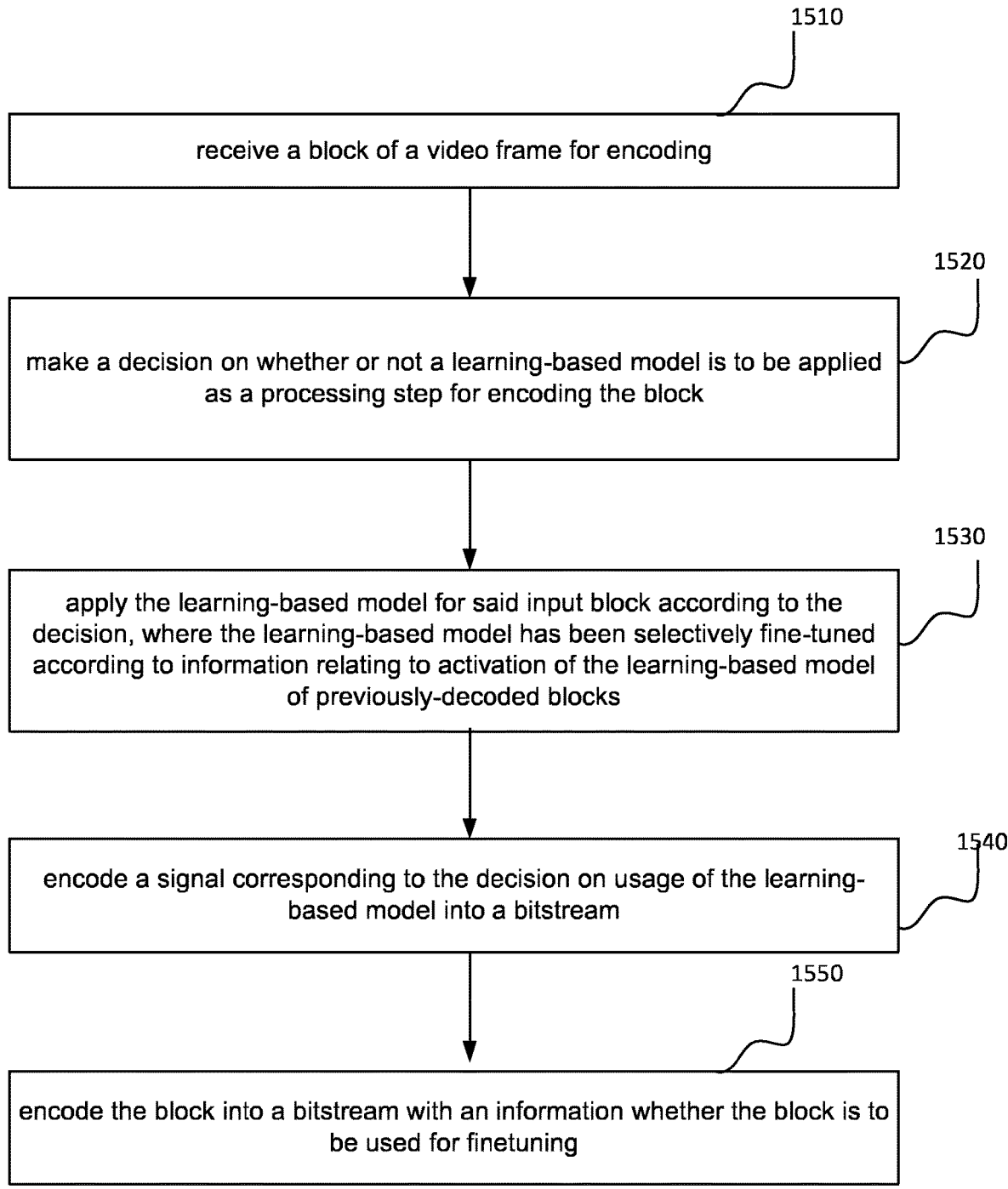
FIG. 15 is a flowchart illustrating a method according to an embodiment.

The method according to an embodiment is shown in FIG. 15. The method generally comprises receiving 1510 a block of a video frame for encoding; making 1520 a decision on whether or not a learning-based model is to be applied as a processing step for encoding the block; applying 1530 the learning-based model for said input block according to the decision, where the learning-based model has been selectively fine-tuned according to information relating to activation of the learning-based model of previously-decoded blocks; encoding 1540 a signal corresponding to the decision on usage of the learning-based model into a bitstream; and encoding 1550 the block into a bitstream with an information whether the block is to be used for finetuning. Each of the steps can be implemented by a respective module of a computer system.

An apparatus according to an embodiment comprises means for receiving a block of a video frame for encoding; means for making a decision on whether or not a learning-based model is to be applied as a processing step for encoding the block; means for applying the learning-based model for said input block according to the decision, where the learning-based model has been selectively fine-tuned according to information relating to activation of the learning-based model of previously-decoded blocks; means for encoding a signal corresponding to the decision on usage of the learning-based model into a bitstream; and means for encoding the block into a bitstream with an information whether the block is to be used for finetuning. The means comprises at least one processor, and a memory including a computer program code, wherein the processor may further comprise processor circuitry. The memory and the computer program code are configured to, with the at least one processor, cause the apparatus to perform the method of FIG. 15 according to various embodiments.

Figure 16:
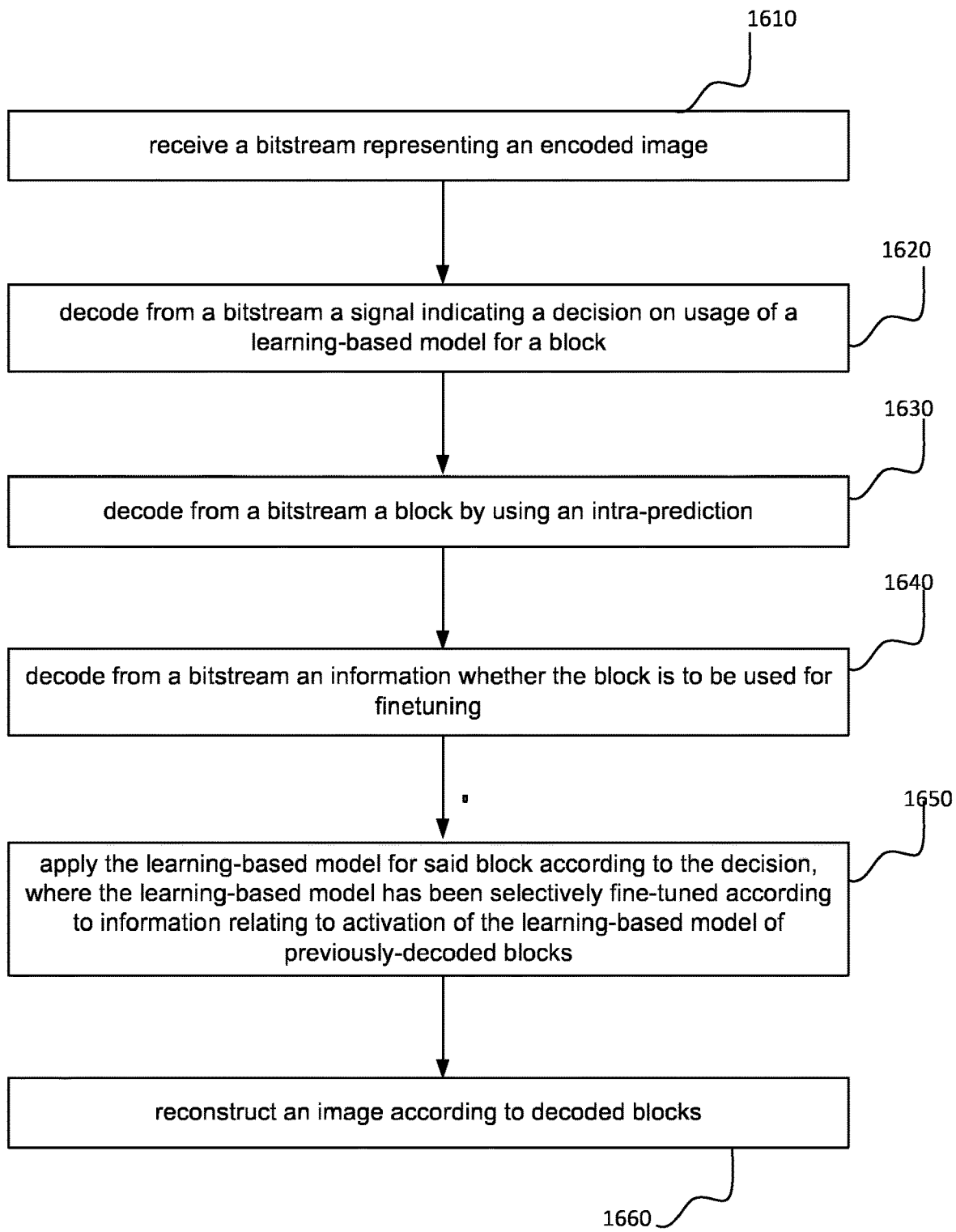
FIG. 16 is a flowchart illustrating a method according to another embodiment.

The method according to another embodiment is shown in FIG. 16. The method generally comprises receiving 1610 a bitstream representing an encoded image; decoding 1620 from a bitstream a signal indicating a decision on usage of a learning-based model for a block; decoding 1630 from a bitstream a block by using an intra-prediction; decoding 1640 from a bitstream an information whether the block is to be used for finetuning; applying 1650 the learning-based model for said block according to the decision, where the learning-based model has been selectively fine-tuned according to information relating to activation of the learning-based model of previously-decoded blocks; and reconstructing 1660 an image according to decoded blocks. Each of the steps can be implemented by a respective module of a computer system.

An apparatus according to another embodiment comprises means for receiving a bitstream representing an encoded image; means for decoding from a bitstream a signal indicating a decision on usage of a learning-based model for a block; means for decoding from a bitstream a block by using an intra-prediction; means for decoding from a bitstream an information whether the block is to be used for finetuning; means for applying the learning-based model for said block according to the decision, where the learning-based model has been selectively fine-tuned according to information relating to activation of the learning-based model of previously-decoded blocks; and means for reconstructing an image according to decoded blocks. The means comprises at least one processor, and a memory including a computer program code, wherein the processor may further comprise processor circuitry. The memory and the computer program code are configured to, with the at least one processor, cause the apparatus to perform the method of FIG. 16 according to various embodiments.

Figure 17:
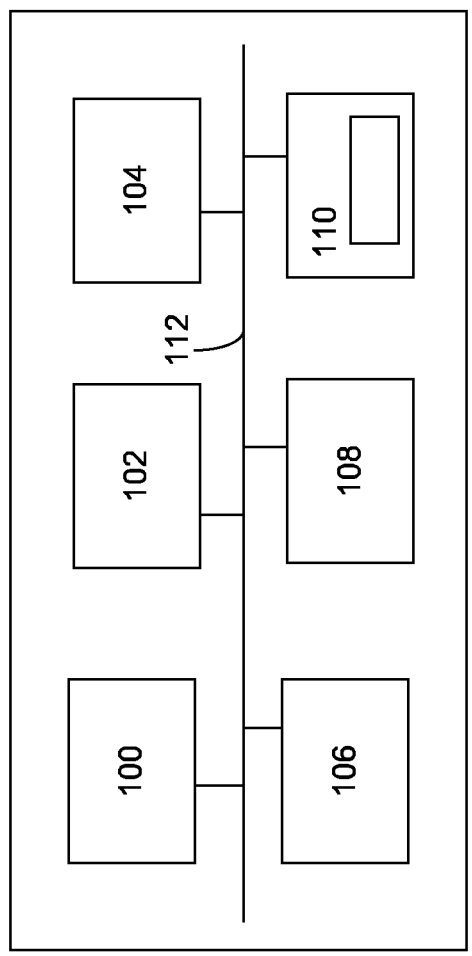
FIG. 17 shows an apparatus according to an embodiment.

FIG. 17 shows an apparatus representing a client device for the purposes of the present embodiments. The functional blocks of the apparatus can also be found in a server according to the present embodiment. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 17 comprises a main processing unit 100, a memory 102, a storage device 104, an input device 106, an output device 108, and a graphics subsystem 110, which are all connected to each other via a data bus 112. A client may be understood as a client device or a software client running on an apparatus.

The main processing unit 100 is a processing unit arranged to process data within the data processing system. The main processing unit 100 may comprise or be implemented as one or more processors or processor circuitry. The memory 102, the storage device 104, the input device 106, and the output device 108 may include other components as recognized by those skilled in the art. The memory 102 and storage device 104 store data in the data processing system 100. Computer program code resides in the memory 102 for implementing, for example, machine learning process. The input device 106 inputs data into the system while the output device 108 receives data from the data processing system and forwards the data, for example to a display. While data bus 112 is shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

Embodiments have been described above in relation to neural network filter. It needs to be understood that embodiments apply similarly to any (de)coding tool or processing block in an encoder/decoder, which can be performed using a neural network. For example, embodiments apply similarly to:

neural network based transform and inverse transform
neural network based quantization and inverse quantization
neural network based prediction, such as NN-based intra prediction, NN-based motion compensation, or NN-based parameter prediction (e.g. motion vector prediction)

Some embodiments have been described above with reference to video (de)coding. It needs to be understood that embodiments similarly apply to image (de)coding, i.e. (de)coding a single image.

In the above, where embodiments have been described with reference to an encoder, it needs to be understood that the resulting bitstream and the decoder have corresponding elements in them. Several examples have been given where the correspondence between processing blocks of an encoder and a decoder are indicated. Thus, embodiments for a decoder can be realized by applying the correspondence between the processing blocks to the embodiments described with reference to an encoder. Likewise, where the embodiments have been described with reference to a decoder, it needs to be understood that the encoder has structure and/or computer program for generating the bitstream to be decoded by the decoder. Thus, embodiments for an encoder can be realized by applying the correspondence between the processing blocks to the embodiments described with reference to a decoder.

Some embodiments above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

It needs to be understood that different embodiments allow different parts to be carried out in different elements. For example, various processes of the computer system may be carried out in one or more processing devices; for example, entirely in one computer device, or in one server device or across multiple user devices. The elements of machine learning process may be implemented as a software component residing on one device or distributed across several devices, as mentioned above, for example so that the devices form a so-called cloud.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
receiving a block of a video frame for encoding;
determining whether a learning-based model is to be applied as a processing step for encoding the block;
applying the learning-based model for said input block based on the determining, wherein the learning-based model has been fine-tuned according to information relating to activation of the learning-based model of previously-decoded blocks;
encoding a signal based on the determining on usage of the learning-based model into a bitstream; and encoding the block into the bitstream with an information whether the block is to be used for finetuning.

2. A method, comprising:
receiving a bitstream representing an encoded image;
decoding from the bitstream a signal indicating a decision on usage of a learning-based model for a block;
decoding from the bitstream the block by using an intra-prediction;
decoding from the bitstream an information whether the block is to be used for finetuning;
applying the learning-based model for said block according to the decision, wherein the learning-based model has been fine-tuned according to information relating to activation of the learning-based model of previously-decoded blocks; and
reconstructing the image according to decoded blocks.

3. An apparatus comprising at least one processor, memory including computer program code, the memory and the computer program code configured to, with the at least one processor, cause the apparatus to perform at least the following:
receive a block of a video frame to encode;
determine whether a learning-based model is to be applied to encode the block;
apply the learning-based model for said block based on the determining, wherein the learning-based model has been fine-tuned according to information relating to activation of the learning-based model of previously-decoded blocks;
encode a signal based on the determining on usage of the learning-based model into a bitstream; and
encode the block into the bitstream with an information whether the block is to be used for finetuning.

4. The apparatus according to claim 3, wherein to encode the block the apparatus is further caused to:
enhance visual quality of a predicted or reconstructed content that is to be applied for said block;
predict the block based on previously encoded or reconstructed blocks;
process a prediction error block between the block and a predicted block.

5. The apparatus according to claim 3, wherein the apparatus is further caused to finetune the learning-based model by training the learning-based model by using nearby blocks to which learning-based model was not applied and by using ground-truth corresponding blocks being used instead of an output of the learning-based model.

6. The apparatus according to claim 5, wherein the apparatus is further caused to finetune blocks to which the learning-model has been applied.

7. The apparatus according to claim 3, wherein the apparatus is further caused to selectively provide output of a first copy of a learning model and the ground-truth as one of the inputs to a discriminator, and the output of a second copy of a learning model as the other input to the discriminator.

8. The apparatus according to claim 7, wherein the apparatus is further caused to finetune the first copy of the learning model according to adversarial training, in order to maximize a loss of the discriminator.

9. The apparatus according to claim 7, wherein the apparatus is further caused to train the discriminator in order to minimize a loss of the discriminator.

10. The apparatus according to claim 3, wherein when it is determined not to use the learning-based model, the input for the learning-based model is used as output instead of the output of the learning-based model.

11. The apparatus according to claim 3, wherein the apparatus is caused to determine whether the learning-based model is used based on one of the following: rate-distortion optimization or output of another neural network.

12. The apparatus according to claim 3, wherein the apparatus is further caused to control an activation and a deactivation of the learning-based model by using a switch.

13. The apparatus according to claim 12, wherein the switch is a neural network switch, whereupon the apparatus is further caused to perform:
determine a classification confidence of the switch;
compare the classification confidence to a predetermined threshold; and
encode the signal corresponding to the decision on usage of the learning-based model when the classification confidence is below the predetermined threshold.

14. The apparatus according to claim 12, wherein the switch is a neural network switch, and wherein the switch is configured to generate a predicted signal corresponding to the decision on usage of the learning-based model.

15. The apparatus according to claim 14, wherein the apparatus is further caused to use a classification confidence being output by the switch with the predicted signal in encoding the signal corresponding to the decision on usage of the learning-based model.

16. The apparatus according to claim 3, wherein the learning-based model is used in addition to or instead of a conventional process to perform a similar task without a learning-based model.

17. The apparatus according to claim 16, wherein when the learning-based model is used in addition to the conventional process, the output of the learning-based model and the conventional process is combined, and the combination is used as the output.

18. The apparatus according to claim 3, wherein the signal corresponding to the decision is included into the bitstream for one or more of the following: each block, each coding unit, or each coding tree unit.

19. The apparatus according to claim 3, wherein the apparatus is further caused to train an additional neural network to determine whether a learning-based model as a further filter to enhance visual quality of the reconstructed content is needed.

20. An apparatus comprising at least one processor, memory including computer program code, the memory and the computer program code configured to, with the at least one processor, cause the apparatus to perform at least the following:
receive a bitstream representing an encoded image;
decode from the bitstream a signal indicating a decision on usage of a learning-based model for a block;
decode from the bitstream the block by using an intra-prediction;
decode from the bitstream an information whether the block is to be used for finetuning;
apply the learning-based model for said block according to the decision, where the learning-based model has been fine-tuned according to information relating to activation of the learning-based model of previously-decoded blocks; and
reconstruct the image according to decoded blocks.

* * * * *